US010756883B2

(12) United States Patent
Brehmer et al.

(10) Patent No.: US 10,756,883 B2
(45) Date of Patent: Aug. 25, 2020

(54) SYSTEMS AND METHODS FOR DATA COLLECTION WITH BLOCKCHAIN RECORDING

(71) Applicant: Trisk Technologies, Inc., Burlingame, CA (US)

(72) Inventors: Thomas M. Brehmer, Burlingame, CA (US); Yuri Vizitei, Columbia, MO (US)

(73) Assignee: Trist Technologies, Inc., Burlingame, CA (US)

( * ) Notice: Subject to any disclaimer, the term of this patent is extended or adjusted under 35 U.S.C. 154(b) by 316 days.

(21) Appl. No.: 15/875,218

(22) Filed: Jan. 19, 2018

(65) Prior Publication Data

US 2019/0229890 A1    Jul. 25, 2019

(51) Int. Cl.

| | |
|---|---|
| *H04L 9/06* | (2006.01) |
| *H04L 9/32* | (2006.01) |
| *H04L 9/14* | (2006.01) |
| *H04L 9/30* | (2006.01) |
| *H04L 9/08* | (2006.01) |
| *G06F 40/174* | (2020.01) |

(52) U.S. Cl.
CPC .......... *H04L 9/0637* (2013.01); *G06F 40/174* (2020.01); *H04L 9/088* (2013.01); *H04L 9/0861* (2013.01); *H04L 9/14* (2013.01); *H04L 9/30* (2013.01); *H04L 9/3239* (2013.01); *H04L 9/3242* (2013.01); *H04L 2209/38* (2013.01)

(58) Field of Classification Search
CPC ..... H04L 9/0637; H04L 9/3239; H04L 9/088; H04L 9/0861; H04L 9/30; H04L 9/14; H04L 9/3242; H04L 2209/38
See application file for complete search history.

(56) References Cited

U.S. PATENT DOCUMENTS

| | | | |
|---|---|---|---|
| 2016/0328713 | A1 | 11/2016 | Ebrahimi |
| 2017/0324711 | A1 | 11/2017 | Feeney et al. |
| 2018/0276626 | A1* | 9/2018 | Laiben ............. G06Q 20/02 |
| 2019/0327218 | A1* | 10/2019 | Altenhofen ........ H04L 9/3236 |

FOREIGN PATENT DOCUMENTS

WO    WO-2019143593 A1    7/2019

OTHER PUBLICATIONS

"International Application Serial No. PCT/US2019/013592, International Search Report dated May 24, 2019", 4 pgs.
"International Application Serial No. PCT/US2019/013592, Invitation to Pay Additional Fees dated Apr. 2, 2019", 2 pgs.
"International Application Serial No. PCT/US2019/013592, Written Opinion dated May 24, 2019", 7 pgs.

* cited by examiner

*Primary Examiner* — Huan V Doan
(74) *Attorney, Agent, or Firm* — Schwegman Lundberg & Woessner, P.A.

(57) ABSTRACT

Various embodiments provide for data object collection, management, tracking, or control with a blockchain. In particular, some embodiments collect, manage, track, or control one or more data objects between two or more nodes, where each node is associated with a particular user and each particular user controls their respective data objects through their associated node. A node associated with a particular user can effectively serve as a computer container for storing data objects associated with the particular user, and further for supporting one or more functions (e.g., collection, management, tracking, or control functions) with respect to the data objects associated with the particular user.

9 Claims, 24 Drawing Sheets

SYSTEMS AND METHODS FOR DATA COLLECTION WITH BLOCKCHAIN RECORDING

TECHNICAL FIELD

The present disclosure relates generally to data collection, and, more particularly, various embodiments described herein provide for systems, methods, techniques, instruction sequences, and devices for data collection with blockchain-based controlling, recording, or both.

BACKGROUND

Collection of information using computer-enabled technologies is essential for business operations, especially in contexts where a third-party advisor or consultant provides professional assistance or services to a client. For instance, the use of electronic questionnaires or forms can be beneficial in collecting client information with respect to tax preparation, rendering legal advice or services (e.g., filing corporate documents), providing technical support, handling insurance claims, or seeking medical services. Oftentimes, the information collected is private or confidential in nature and, as such, the clients providing the information want to track (e.g., audit) or control (e.g., control access rights) how the collected information (e.g., stored as one or more data objects) is being used and who is using the collected information. Information collection has become exceedingly difficult in the current business environment, as many advisor/consultants and clients resort to using e-mail correspondence or shared data storage (e.g., a shared folder through a cloud-based service) as a means for collecting information. This can not only make it difficult to track or control usage of the collected information, but also make it a challenge to ensure that the information is being collected from clients by secure means and utilized for stated purposes.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
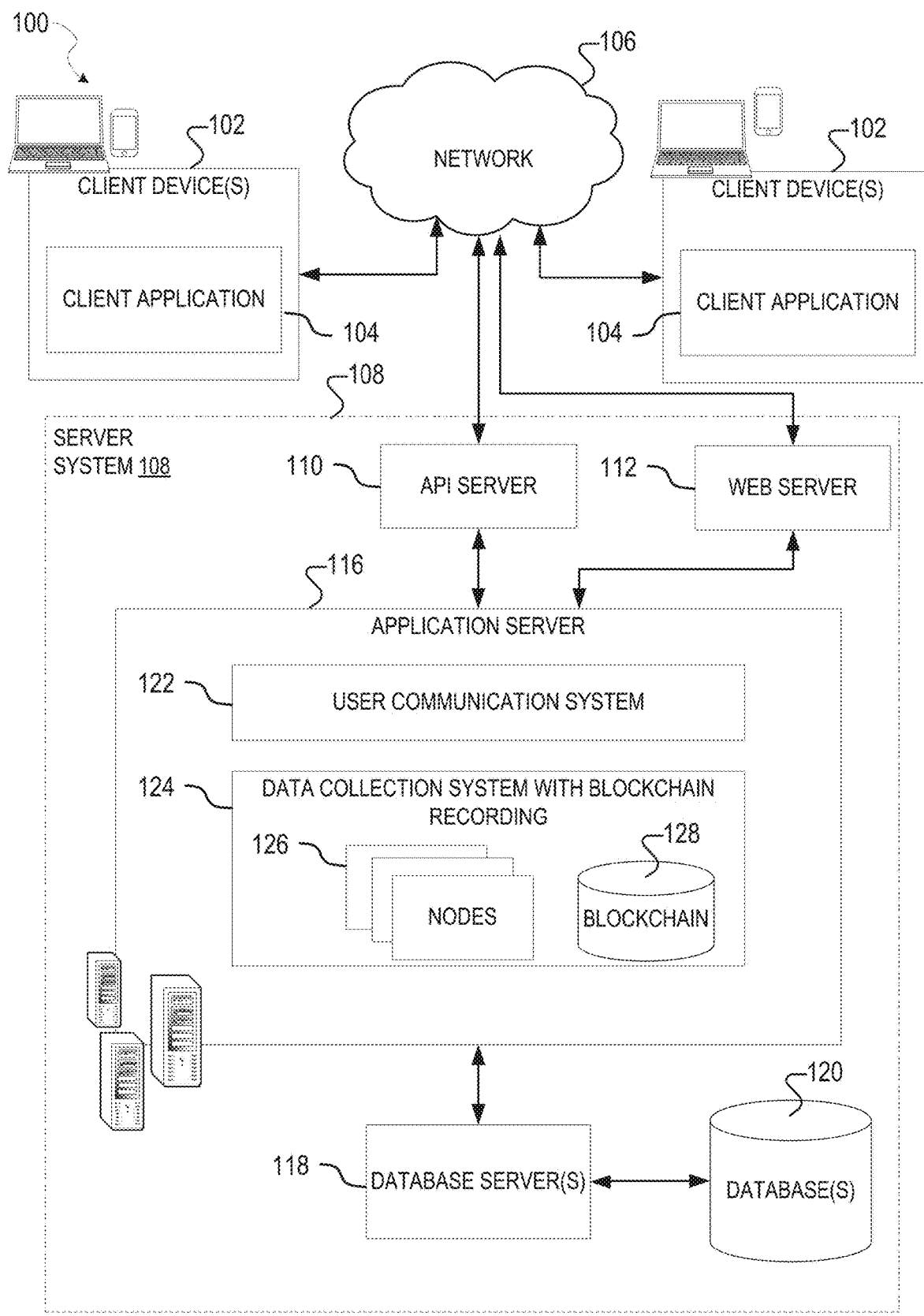
FIG. 1 is a block diagram showing an example data system that includes a data collection system with a blockchain, according to some embodiments.

Various embodiments described herein provide for data object collection, management, tracking, control, or recording with a blockchain. In particular, some embodiments collect, manage, track, or control one or more data objects between two or more nodes, where each node is associated with a particular user and each particular user controls their respective data objects through their associated node. In this way, a node associated with a particular user can effectively serve as a computer container for storing data objects associated with (e.g., owned by or collected from) the particular user, and further for supporting one or more functions (e.g., collection, management, tracking, or control functions) with respect to the data objects associated with the particular user. For some embodiments, a node is exclusively associated with and dedicated to collecting, storing, managing, and controlling data collected from or owned by the particular user.

For example, a data object controlled through a particular node, by a particular user, may comprise data collected from or submitted by the particular user through the particular user's node. Additionally, a data object controlled through a particular node, by a particular user, may comprise a data object that has been transferred (e.g., ownership transfer of the data object) from another user's node (associated with another user) to the particular's user node. For some embodiments, the data object collected from the particular user may be facilitated through an electronic form, which may be submitted for completion by the particular user through the particular user's node. For instance, the electronic form may include one or more fields (e.g., text fields, radio options, selectable options, drop down boxes, check boxes) through which the particular user can enter requested information. For some embodiments, the data object collected from the particular user may comprise one or more data files submitted (e.g., as documents to support or accompany information provided through the electronic form) by the particular user through the particular user's node.

In ways described herein, various embodiments can improve the ability of a machine (e.g., a computer system) to collect, manage, track or control data objects on behalf of a particular user. For example, by collecting information (e.g., files, completed forms, etc.) from a particular user through a particular node associated with the particular user, some embodiments ensure that the information collected from the particular user can remain under the management, tracking, and control of the particular user. A particular user, for example, can decide to store, grant access to, or transfer ownership of a data object comprising information collected from the particular user. Additionally, through their associated node, the particular user can retrieve, or request access to, a data object stored on another node associated with another user, which may comprise information collected from the other user. It will be understood that for some embodiments, a data object retrieved by a first node, from a second node, is retained by the first node for the duration of a specific user function (e.g., user review of the data object at the first node). When the specific user function ends (e.g., user at first node ends the review by approving or rejecting the data object), the data object is not retained in data storage by the first node, and ownership, control, and management of the data object can be retained by the second node.

The blockchain can permit a particular user to audit transactions relating to a data object stored on the particular user's node, or a data object stored on another node associated with another user. These and other embodiments may be useful, for example, as a tool for assisting a professional (e.g., an advisor user associated with a first node) in providing their services to a client (e.g., a client user associated with a second node).

According to some embodiments, information is collected from a client user (e.g., using an electronic form, which may be interactively filled in by two or more users working in collaboration) as a data object, and the data object is stored with and controlled by a client's node. Through an advisor's node, an advisor user may request from the client's node access to the data object stored on the client's node. In response, the client user can cause the client's node to grant the advisor's node access rights to the data object stored on the client's node. Using the granted access right, the advisor's node can retrieve from the client's node a copy of the stored data object (e.g., so that the advisor user can review information collected in the data object) while the client's node retains storage and control of the data object. According to some embodiments, these (and other) data object transactions between the client's node and the advisor's node are recorded on a blockchain accessible to both the client's node and the advisor's node. Additionally, the blockchain may facilitate one or more transaction with respect to the data object, such as recording a response (e.g., a review response) to the data object, communicating requests between nodes, communicating access rights between nodes, and communicating licensing for the data object between nodes.

According to some embodiments, a user (e.g., client user) of a node can de-associate (e.g., disconnect) the node from a plurality of nodes such that the node is in autonomous management and control of the one or more data objects associated with the node (e.g., those owned by the client user). In this way, the client user, for example, can effectively move (e.g., switch) to from one subject matter expert (SME) user (e.g., tax preparation organization) he or she is using and sharing the client user data with, to another SME user. (e.g., tax preparation organization) while ensuring that management and control of their client user data moves with them (e.g., "walks away with them"). Such a movement can ensure that access to the client user data shared with the first SME user is removed, while new access to the client user by the second SME user is established. Additionally, such a feature may permit an embodiment to comply with various compliance standards, such as General Data Protection Regulation (GDPR).

As used herein, performing an operation with a blockchain can comprise any number of blockchain operations including, for example, recording to the blockchain or reading data from the blockchain.

As used herein, a user may be represented by a user account, which may be associated with a human individual or an organization, such as a business entity. For example, a user may comprise a corporation, an organization that provides professional services (e.g., tax preparation firm, law firm, medical group, etc.), an individual accountant, an individual lawyer, and a medical professional.

As used herein, a node may comprise a single physical machine (e.g., single server, or a single client device) or a single virtual machine. For example, a node may comprise a single client device, a single server, or a virtual machine residing in a cloud-computing environment. Depending on the embodiment, the node associated with a particular user may be one operated and maintained by the particular server, or the node be one operated and maintained on-behalf of the particular user by a third-party service provider, who may operate/maintain nodes for several different users. The node may include an application program interface (API), which permits a software application internal or external to the node to use data object functions supported by various embodiments described herein. In this way, different software applications (e.g., provided or used by different types of users) can be agnostically supported by various embodiments. Different software applications may include, for instance, a client user application, an admin user application, an advisor/consultant user application.

As used herein, a blockchain may comprise a data structure that stores a series of linked data blocks, where a data block in the series is linked to a prior block in the series, comprises a timestamp of blockchain creation, and comprises a hash (e.g., cryptographic hash of the contents) of the prior data block. In this way, the blockchain provides a chain of data blocks that makes it difficult to change a data block in the chain without compromising the integrity of the entire chain. Some embodiments described herein may use a blockchain as an electronic ledger that maintains a secure, historical record of data transactions relating to data objects (e.g., information regarding the source or destination of a data object transaction). As an electronic ledger, the blockchain may comprise a distributed ledger that may be accessed by two or more nodes. Some embodiments described herein may also add one more new data blocks to a blockchain to store data on the blockchain, for example, a data object, a hash of a data object, metadata regarding a data object, a public/private key used in performing data object transactions, or some combination thereof. For some embodiments, a plurality of nodes can access a common blockchain when performing data object functions described herein. Though the blockchain may be accessible by two or more nodes of an embodiment, one or more data objects stored on the blockchain may be encrypted before being stored on the blockchain as one or more data blocks. This can ensure that only those nodes associated with authorized users (e.g., those nodes having appropriate access rights or public keys) can access the encrypted data objects stored on the blockchain. Depending on the embodiment, the blockchain may be stored on a single or distributed datastore. For some embodiments, each node (e.g., client node) may be associated with its own blockchain.

As used herein, a business process object may comprise a business process model notation (BPMN) model. For various embodiments described herein, a business process object which may be used to define a business process that can be launched/performed and to determine what data is to be collected as part of the business process as it is performed. For instance, a business process defined by a business process object may indicate one or more requests, or one or more electronic forms, that are to be completed (e.g., by a client) as part of performing the business process. The business process may be performed, for example, by a professional as a part of providing services to a client.

For some embodiments, two or more nodes (e.g., associated with two or more users) may implement a distributed network that can access a common blockchain, which can permit each node to add a data block to the end of the common blockchain or read a data block from the common blockchain.

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data collection system 124 with a blockchain, according to some embodiments. By including the data collection system 124, the data system 100 can enable data object collection, management, tracking, permission control, licensing, or some combination thereof, by one or more client devices 102. As shown, the data system 100 includes multiple client devices 102, a server system 108, and a network 106 (e.g., including Internet, wide-area-network, local-area-network, wireless network, etc.) that communicatively couples them together. Each client device 102 can host a number of applications, including a client application 104. Each client application 104 may communicate data with one or more other instances of the client application 104, or with the server system 108 via a network 106.

Accordingly, each client application 104 can communicate and exchange data with another client application 104 and with the server system 108 via the network 106. The data exchanged between the client applications 104, and between a client application 104 and the server system 108 could include, without limitation, data objects, requests, responses, public/private keys, hash values, access rights data, license data, and authentication data.

The server system 108 provides server-side functionality via the network 106 to a particular client application 104. While certain functions of the data system 100 are described herein as being performed by the data collection system 124 on the server system 108, it will be appreciated that the location of certain functionality within the server system 108 is a design choice. For example, it may be technically preferable to initially deploy certain technology and functionality within the server system 108, but to later migrate this technology and functionality to the client application 104 where a client device 102 provides enhanced data object functionality.

The server system 108 supports various services and operations that are provided to the client application 104 by the user communication system 122 and the data collection system 124. Such operations include transmitting data from the data collection system 124 to the client application 104, receiving data from the client application 104 to the data collection system 124, and the data collection system 124 processing data generated by the client application 104. This data may include for example, data objects, requests, responses, public/private keys, hash values, access rights data, license data, and authentication data. Data exchanges within the data system 100 may be invoked and controlled through functions available via an application program interface (API), or one or more user interfaces (UIs) of the client application 104, which may include web-based UIs provided by the server system 108 for presentation at the client device 102.

With respect to the server system 108, an API server 110 is coupled to, and provides a programmatic interface to, an application server 116, which hosts the user communication system 122 and the data collection system 124. The application server 116 is communicatively coupled to a database server 118, which facilitates access to a database 120 that stores data associated with the application server 116.

The API server 110 receives and transmits data (e.g., API calls, commands, data objects, requests, responses, public/private keys, hash values, access rights data, license data, and authentication data) between the client device 102 and the application server 116. Specifically, the API server 110 provides a set of interfaces (e.g., routines and protocols) that can be called or queried by the client application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); interview sessions functionality; business process operations (e.g., starting, generating, etc.); user communications; and calendar functionality.

The application server 116 hosts a number of applications and subsystems, including a user communication system 122 and the data collection system 124 with a blockchain 128. The user communication system 122 implements a number of message processing technologies and functions, including exchanging messages between multiple instances of the client application 104. The user communication system 122 may facilitate user messaging in conjunction with other operations of the data collection system 124. For some embodiments, the user communication system 122 supports message threads, where a plurality of users may exchange messages (e.g., in connection with entering information into an electronic form).

The application server 116 also includes the data collection system 124, which supports various functions and services with respect to various embodiments described herein. For instance, the data collection system 124 may support data object collection, management, tracking, or control with respect to one or more instances of the client applications 104. As shown, the data collection system 124 comprises multiple nodes 126 and the blockchain 128, where each of the nodes 126 is associated with a particular user and each particular user controls their respective data objects through their associated node, and each of the nodes may access the blockchain 128 to perform operations described herein. In this way, each of the node 126 can effectively serve as a computer container for storing data objects associated with the particular user, and further for supporting one or more functions (e.g., collection, management, tracking, or control functions) with respect to the data objects associated with the particular user. Though more than one node is illustrated with respect to the data collection system 124, for some embodiments, the data collection system 124 supports a single node 126 and interacts with another node 126 supported by a separate data collection system 124. For instance, a client user's node may be supported by a data collection system 124 that is on-premise with respect to the client user, and a subject matter expert (WE) user's node may be supported by a data collection system 124 that is hosted on a cloud-based computer platform. More regarding various embodiments of a data collection system are described with respect to FIG. 2.

The application server 116 is communicatively coupled to a database server 118, which facilitates access to a database 120 in which may be stored data associated with the user communication system 122, the data collection system 124, or both. Though the blockchain 128 is shown as a separate entity from the database 120, for some embodiments, the blockchain 128 may be implemented (at least in part) by the database 120.

Figure 2:
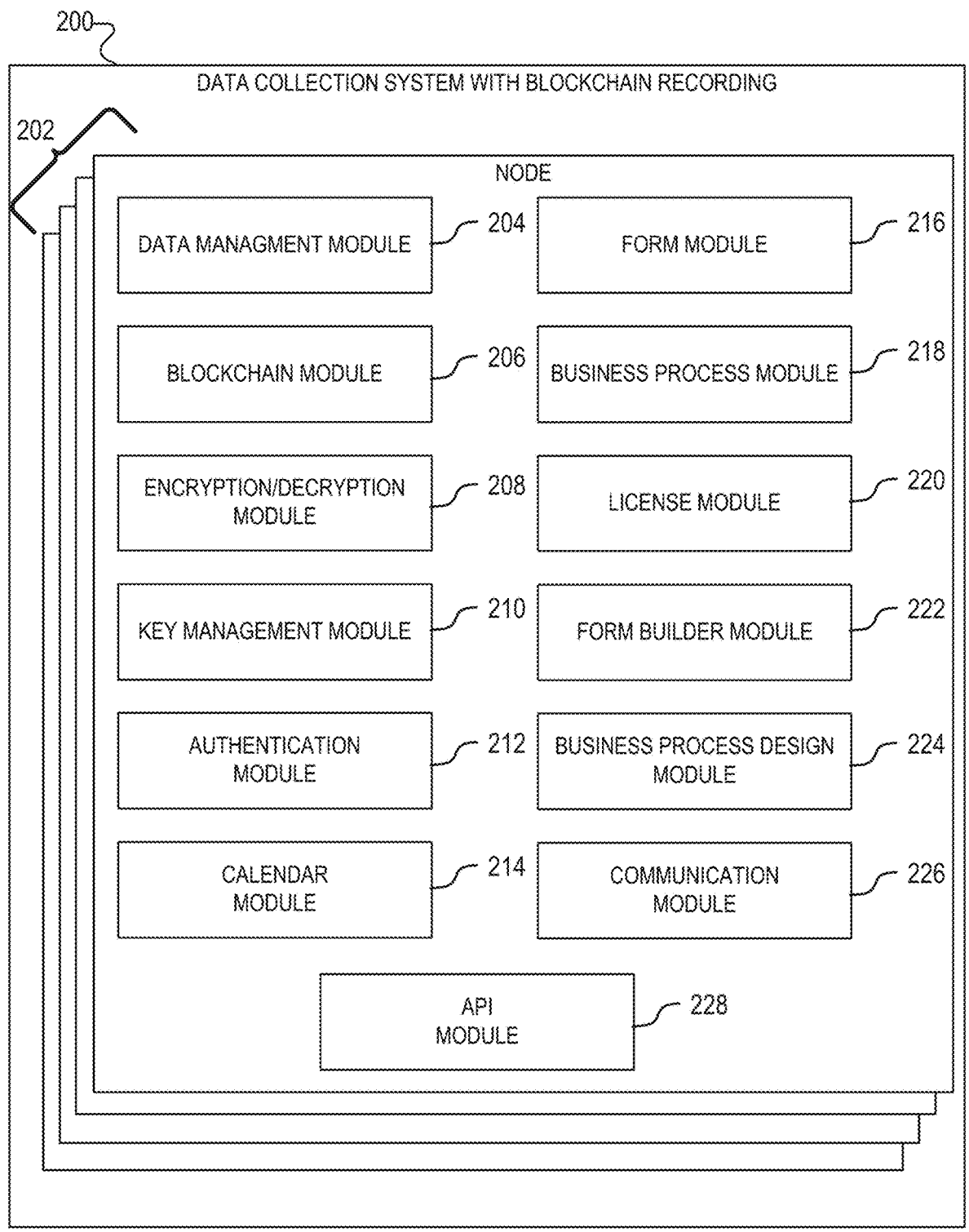
FIG. 2 is a block diagram illustrating an example data collection system with a blockchain, according to some embodiments.

FIG. 2 is a block diagram illustrating an example data collection system 200 with a blockchain, according to some embodiments. As shown, the data collection system 200 comprises two or more nodes 202, where each of the nodes 202 includes a data management module 204, a blockchain module 206, an encryption/decryption module 208, a key management module 210, an authentication module 212, a calendar module 214, a form module 216, a business process module 218, a license module 220, a form builder module 222, a business process design module 224, a communication module 226, and an API module 228. For various embodiments, the components and arrangement of components may vary from what is illustrated in FIG. 2. For instance, a node 202 of the data collection system 200 can include more or fewer components than the components shown in the FIG. 2.

As noted herein, a particular node 202 may be associated with a particular user, which permits the particular user to interact (e.g., participate) with the data collection system 200 in accordance with various embodiments described herein. For some embodiments, each node of the data collection system 200 includes its own instance of the modules 204-228. Additionally, by way of its own instance of the blockchain module 206, a node of the data collection system 200 may access a blockchain that is commonly accessed by one or more other nodes of the data collection system 200, thereby facilitating various operations described herein.

The data management module 204 may facilitate or support management and storage of a data object with respect to a data storage device associated with a particular node 202-1 of the nodes 202. For example, the data management module 204 may include, or interface with, a data management system that is associated with or included by the node 202-1. The data storage device associated with the node 202-1 may comprise one that is included as part of the node 202-1, or one that external to the node 202-1 but coupled to the node 202-1 (e.g., by way of a network connection). The data storage device associated with the node 202-1 may be one that stores data for a number of the nodes 202 of the data collection system 200 but in compartmentalized data spaces dedicated to individual nodes 202. For example, the data storage device may comprise data space for the node 202-1 on a distributed storage system. For the node 202-1, the data management module 204 can facilitate storage of a data object, removal of the data object, or transfer of the data object from the node 202-1 to another node (e.g., node 202-2), which may be facilitated by a peer-to-peer transfer between the two nodes respective data management systems.

The blockchain module 206 may facilitate or support access by the node 202-1 with respect to a blockchain. As used herein, access to the blockchain can include writing data (e.g., adding a data block) to the blockchain or reading data from the blockchain.

The encryption/decryption module 208 may facilitate or support encryption and decryption of data on the node 202-1, such as data objects, requests, responses, and the like.

The key management module 210 may facilitate or support storing and managing, (e.g., within a key vault) one or more keys associated with the node 202-1, such as a private key of the node 202-1, a public key of the node 202-1, or a key of a data object associated with (e.g., stored with respect to) the node 202-1. The key management module 210 may also facilitate or support generation of a key at the node 202-1, may retrieve a key from another node, or provide a key to another node. For some embodiments, one or more public keys of the node 202-1 are stored on the blockchain as well to facilitate usage of public/private cryptography when communicating data objects between nodes, as described herein.

The authentication module 212 may facilitate or support authentication of a user of the node 202-1 based on user-provided credentials, such as username, password, biometric information, a physical token (e.g., smart card), or the like. To facilitate authentication, the authentication module 212 may interact with an authentication device or server external to the node 202-1. Depending on the embodiment, the authentication module 212 may be used to authenticate a user during a login process, when a user sends a request, or when a user responds to a request (e.g., a user on node 202-1 approves a request from a user on another node).

The calendar module 214 may facilitate or support, on the node 202-1, calendar operations with respect to the node 202-1, which may include creating or setting calendar events, reminders or deadlines with respect to collection of information (e.g., using electronic forms during an interview session) from users associated with the nodes 202.

The form module 216 may facilitate or support, on the node 202-1, retrieving, loading (e.g., opening), storing, or updating an electronic form. For some embodiments, the form module 216 verifies that the electronic form being served for use in collection of data from a client user is current and identical as defined by a SME user. Additionally, for various embodiments described herein, an electronic form and data collected using that electronic form can represent a single data object. In this way, where the electronic form is updated (e.g., new version of electronic form created), the version of the electronic form used to originally collect data continues to be associated with that data collected.

The business process module 218 may facilitate or support, on the node 202-1, retrieving, loading, performing (e.g., launching or starting), storing, or updating a business process defined by a business process object. An example of a business process object may include, without limitation, a data object containing data relating to a business process model notation (BPMN) model. Example functions or operations defined by the BPMN model for use in a business process include, without limitation, approval, rejection, export, payment, fax, and the like.

The license module 220 may facilitate or support, on the node 202-1 creating, retrieving, loading, generating, updating, or enforcing license data, which may be associated with a data object (e.g., pre-existing data object) used to generated new data objects, such as a new electronic form (e.g., via the form builder module 222) or a new business process data object (e.g., via the business process designed module).

The form builder module 222 may facilitate or support generating a new electronic form, which may or may not be generated based on an existing data object (e.g., licensable data object having associated license data). The existing electronic form may be available through a catalog or store of predesigned or prebuilt data objects supported by the data collection system 200 and accessible by one or more of the nodes 202. For some embodiments, the form builder module 222 permits a first user (e.g., SME user) to generate an electronic form that collects appropriate data from a second user (e.g., client user) in accordance with the data collection requirements that the first user is attempting to fulfill (e.g., as part of a service rendered by the first user to the second user). The data collection requirements may be determined by a decision tree generated by the first user (e.g., the SME user) using their knowledge, design, and flow. Accordingly, the first user (e.g., the SME user) can generate an electronic form using their knowledge, design, and flow, for collection of data from the second user, without resorting to creation of computer code.

The business process design module 224 may facilitate or support generating a new business process object defining a business process. The business process design module 224 may generate the new business process object based on an existing business process object (e.g., licensable data object having associated license data). The existing business process object may be available through a catalog or store of predesigned or prebuilt data objects supported by the data collection system 200 and accessible by one or more of the nodes 202.

The communication module 226 may facilitate or support communications between users on two or more of the nodes 202. For example, the communication module 226 may include or integrate with a team collaboration tool. The communication between the users may include, without limitation, user to user messages, message threads, chat rooms, audio, video, and the like.

The API module 228 may facilitate or support receiving and responding to API calls received by the node 202-1, where such API calls may be received by a software application that is operating on the node 202-1 or external to the node 202-1.

More regarding the operations and usage of the modules 204-228 are described herein with respect to FIGS. 3-22.

FIGS. 3-10 are flowcharts illustrating example methods for data objects, according to some embodiments. It will be understood that example methods described herein may be performed by a machine in accordance with some embodiments. For example, the method 300 may be performed by a node of an embodiment, such as a node 202 of the data collection system 200. An operation of various methods described herein may be performed by a hardware processor (e.g., a central processing unit or graphics processing unit) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of a method 300 of FIG. 3 may be represented by executable instructions that, when executed by a processor of a computing device, cause the computing device to perform the method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 3:
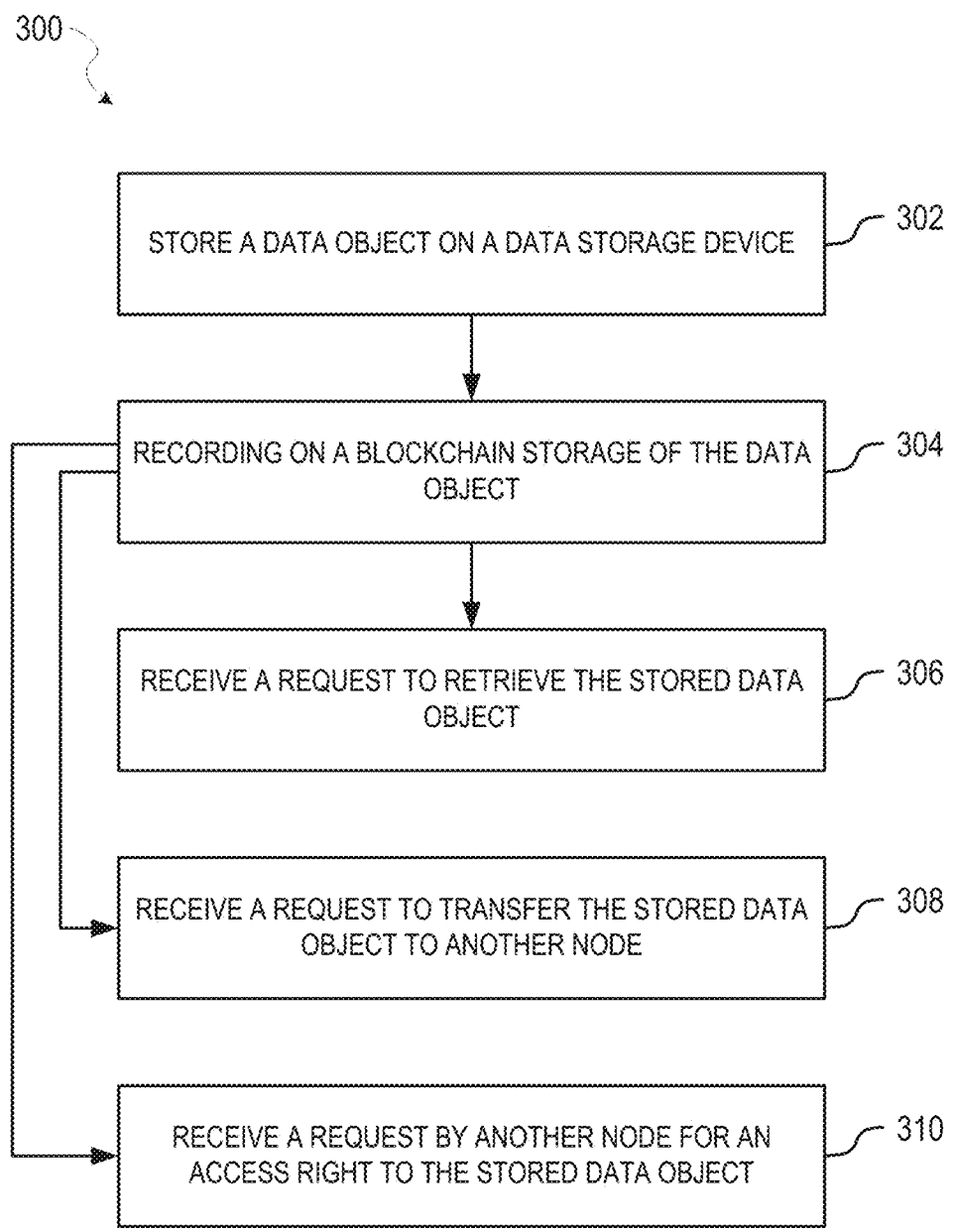
FIGS. 3-10 are flowcharts illustrating example methods for data objects, according to some embodiments.

Referring now to the FIG. 3, the method 300 may be performed by a first node, which may be one of the nodes 202 of the data system 200. As shown, the method 300 begins with operation 302 storing a data object on a data storage device to produce a stored data object on the data storage device. For example, the data object may be stored on the data storage device by the data management module 204 of the first node. The data object may be provided to the first node through an application program interface (API), which may receive the data object from a software application. The software application may be operating on the first node The data object may be stored on the data storage device through a data management system of a first node accessible via the data management module 204 of the first node, where the data storage device may be included by the first node or may be external to the first node but coupled to the data management system of the first node. For some embodiments, operation 302 is performed by the data management module 204 of a first node, and the data storage device is associated with the first node. Storing the data object on the data storage device may comprise generating (e.g., by the key management module 210, which may access a key manager on the first node) a data object key for the data object. The data object may be encrypted by the data object key to produce an encrypted data object. The encryption of the data object may be performed by the encryption/decryption module 208 of the first node. The encrypted data object may be stored on the first data storage device to produce the stored data object on the first data storage device.

The method 300 continues with operation 304 recording on a blockchain storage of the data object on the data storage device, where the recording comprises storing a hash of the data object on the blockchain to produce a stored hash in the blockchain. For example, the storage of the data object may be recorded on the blockchain by the blockchain module 206 of the first node. The hash may comprise a cryptographic hash, and the hash may be generated based on contents of the data object. The hash may be calculated by the encryption/decryption module 208 of the first node. For some embodiments, operation 304 is performed by the blockchain module 206 of the first node.

From operation 304, the method 300 may continue with operation 306, 308, or 310. At operation 306, a request is received to retrieve the stored data object from the data storage device. For example, the request may be received via the API module 228 of the first node. The software application submitting the request through the API may be operating on the first node or may be operating on an entity (e.g., a client device of a user associated with the first node) external to the first node. For some embodiments, operation 306 is performed by the data management module 204 of the first node. The request may be generated by the first node, and the request may be caused by a user associated with the first node. More regarding a response to the request is described herein with respect to a method 400 of FIG. 4.

At operation 308, a request is received to transfer the stored data object from to another node. For example, the request may be received via the API module 228 of the first node. The software application submitting the request through the API may be operating on the first node or may be operating on an entity external to the first node. For some embodiments, operation 308 is performed by the data management module 204 of the first node. The request may be generated by the first node, and the request may be caused by a user associated with the first node. More regarding a response to the request is described herein with respect to a method 500 of FIG. 5.

At operation 310, a request by another node is received for an access right to the stored data object. For example, the request may be received via the API module 228 of the first node. The software application submitting the request through the API may be operating on the first node or may be operating on an external to the first node. For some embodiments, operation 310 is performed by the blockchain module 206 of the first node. The request may be generated by the other node, and the request may be caused by a user associated with the other node. More regarding a response to the request is described herein with respect to a method 600 of FIG. 6. As used herein, an access right (e.g., with respect to a data object) can include, without limitation, write access, read access, deletion access, share access, or copy access.

Figure 4:
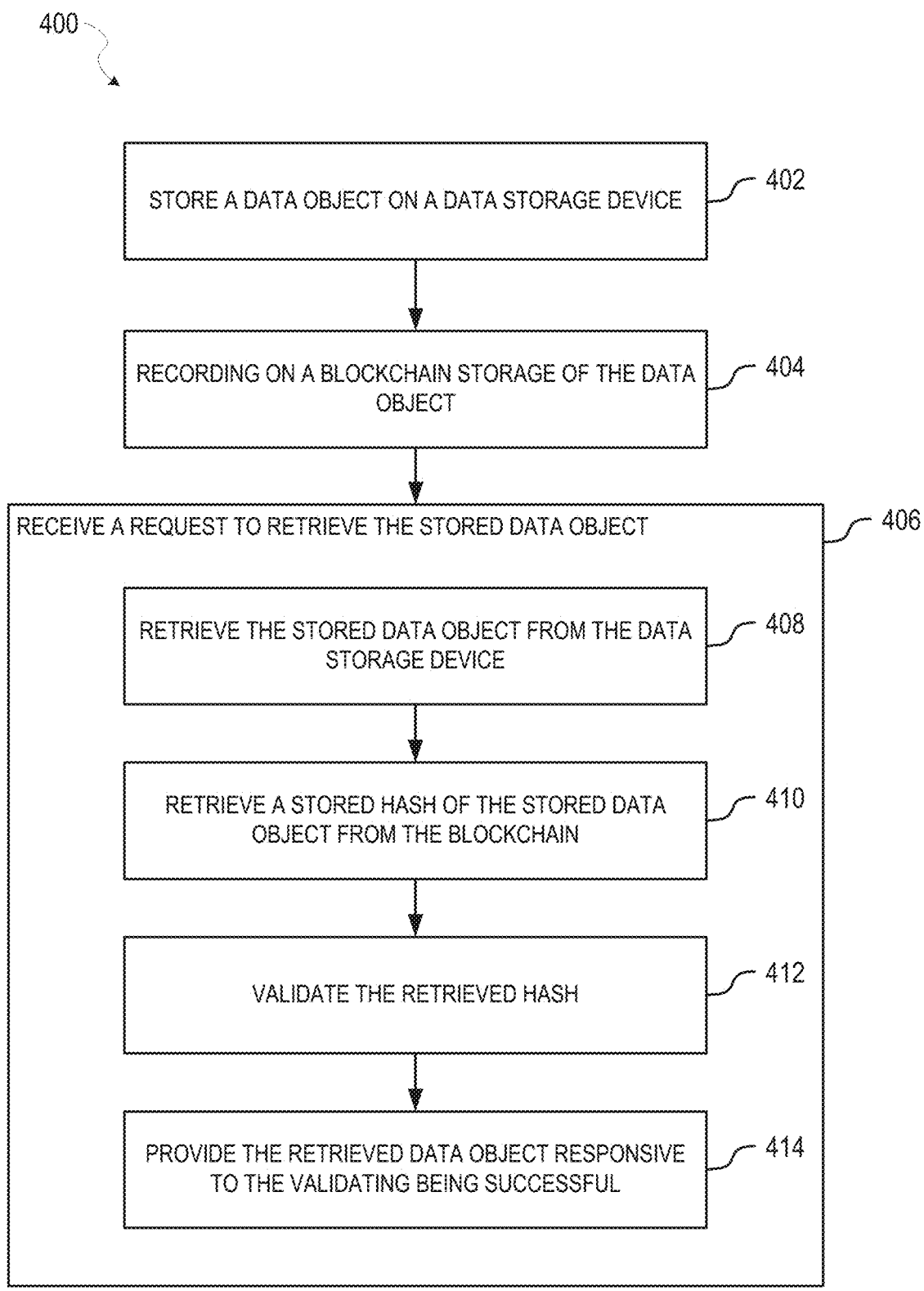

Referring now to the FIG. 4, the method 400 may be performed by a first node, which may be one of the nodes 202 of the data system 200. As shown, the method 400 begins with operations 402 and 404, which according to some embodiments, are respectively similar to operations 302 and 304 of the method 300 described with respect to FIG. 3.

From operation 404, the method 400 continues with operation 406 receiving a request to retrieve the stored data object. For some embodiments, operation 406 is performed by the data management module 204 of a first node. Additionally, for some embodiments, the request may originate from a user associated with the first node (e.g., where the first user want to review the stored data object after its storage).

Responsive to the request, the method 400 performs operations 408-410. At operation 408, the stored data object is retrieved from the data storage device (e.g., the data storage device associated with the first node). For example, the stored data object is retrieved from the data storage device by the data management module 204 of the first node. Where the stored data object on the data storage device was encrypted prior to storage (e.g., as described above with respect to operation 302), a data object key associated with the stored data object may be retrieved (e.g., from the key management module 210 of the first node, which may access a key manager on the first node) to produce a retrieved data object key. The data object key may be the same key that was used to encrypt the stored data object prior to its storage on the data storage device. The stored data object may be retrieved from the data storage device to produce a retrieved data object. The retrieved data object may be decrypted based on the retrieved data object key to produce a decrypted data object, which is a decrypted version of the stored data object. The decryption of the stored data object may be performed by the encryption/decryption module 208 of the first node.

At operation 410, a stored hash of the stored data object may be retrieved (e.g., at the first node) from the blockchain to produce the retrieved hash. For example, the stored hash may be retrieved from the blockchain by the blockchain module 206 of the first node. The stored hash may be one stored on the blockchain by operation 402.

At operation 412, the retrieved hash is validated (e.g., at the first node). For example, the retrieved hash may be validated by the encryption/decryption module 208 of the first node. In response to the retrieved hash being successfully validated at operation 412, the method 400 continues with operation 414 providing the retrieved data object to the requester (e.g., the first node). The providing is responsive to the request received at operation 406. Additionally, the providing may comprise providing, through an API, the retrieved data object to a software application, which may be a requester of the stored data object. The software application may be operating on the first node or may be operating on an entity external to the first node, where the external entity may include a client device of a user associated with the first node.

Figure 5:
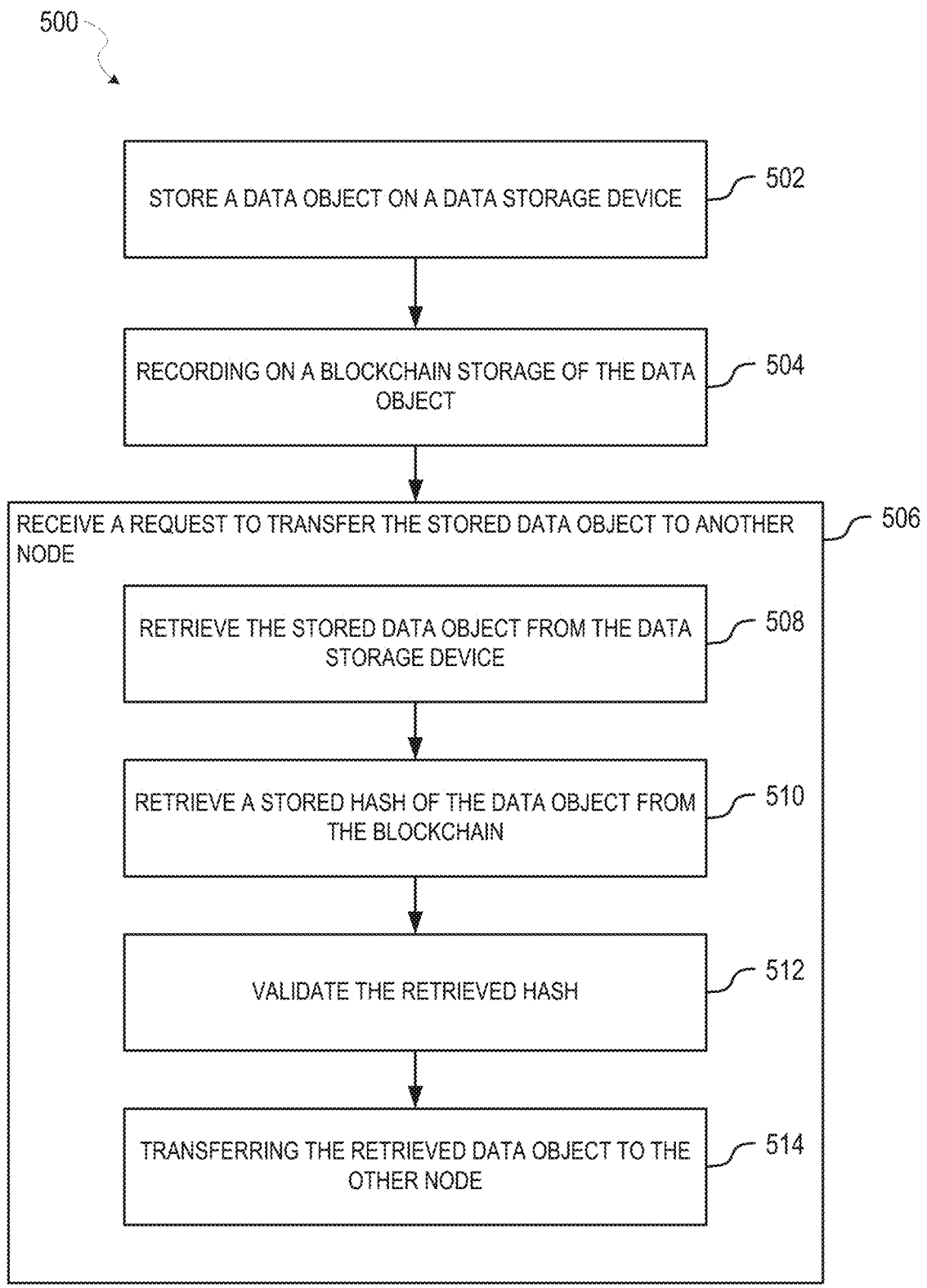

Referring now to the FIG. 5, the method 500 may be performed by a first node, which may be one of the nodes 202 of the data system 200. As shown, the method 500 begins with operations 502 and 504, which according to some embodiments, are respectively similar to operations 302 and 304 of the method 300 described with respect to FIG. 3.

From operation 504, the method 500 continues with operation 506 receiving a request to transfer the stored data object (e.g., on the data storage device of the first node) to another node. The other node may comprise a second node, which may be another one of the nodes 202 of the data system 200. For some embodiments, operation 506 is performed by the data management module 204 of a first node. Additionally, for some embodiments, the request may originate from a user associated with the first node (e.g., where the first user want to review the stored data object after its storage).

Responsive to the request, the method 500 performs operations 508-410. At operation 508, the stored data object is retrieved from the data storage device (e.g., the data storage device associated with the first node). For example, the stored data object is retrieved from the data storage device by the data management module 204 of the first node. Where the stored data object on the data storage device was encrypted prior to storage (e.g., as described above with respect to operation 302), a data object key associated with the stored data object may be retrieved (e.g., from the key management module 210, which may access a key manager on the first node) to produce a retrieved data object key. The data object key may be the same key that was used to encrypt the stored data object prior to its storage on the data storage device. The stored data object may be retrieved from the data storage device to produce a retrieved data object. The retrieved data object may be decrypted based on the retrieved data object key to produce a decrypted data object, which is a decrypted version of the stored data object. The decryption of the stored data object may be performed by the encryption/decryption module 208 of the first node.

At operation 510, a stored hash of the stored data object may be retrieved (e.g., at the first node) from the blockchain to produce the retrieved hash. For example, the stored hash may be retrieved from the blockchain by the blockchain module 206 of the first node. The stored hash may be one stored on the blockchain by operation 502.

At operation 512, the retrieved hash is validated (e.g., at the first node). For example, the retrieved hash may be validated by the encryption/decryption module 208 of the first node. In response to the retrieved hash being successfully validated at operation 512, the method 500 continues with operation 514 transferring the retrieved data object to the other node (e.g., the second node). For example, transferring the retrieved data object from the first node to the second node by the data management module 204 of the first node. The transferring may comprise a peer-to-peer transfer between the first node and the second node (e.g., data management system of the first node and the data management system of the second node).

The stored data object may be encrypted prior to its transfer to the other node (e.g., second node). For example, to encrypt the stored data object prior to the stored data object being transferred from the first node to the second node, the first node (e.g., a key manager of the first node) may retrieve a second node public key associated with the second node. The second node public key may be retrieved from the blockchain, which may have been stored on the blockchain as part of the second node registering with the data collection system 200. The first node may retrieve the second node public key by the key management module 210 of the first node, which may access the key manager of the first node. The first node may retrieve, from a key manager on the first node, a first node private key associated with the first node. The first node may retrieve the first node private key by the key management module 210 of the first node. The first node may encrypt the retrieved data object by the first node private key to produce a first encrypted data object. Next, the first node may encrypt the retrieved data object by the second node public key to produce a second encrypted data object. The first node may perform encrypt operations with respect to the retrieved data object by the encryption/decryption module 208 of the first node. Eventually, the first node can transfer the second encrypted data object from the first node to the second node. As noted herein, the first node may transfer the second encrypted data object by the data management module 204 of the first node, which may access the data management of the first node.

After determining that the transfer from the first node to the second is successful (e.g., by a confirmation from the second node), the first node may remove the stored data object from the data storage device of the first node. For example, the first node may remove the stored data object from the data storage device by the data management module 204 of the first node. Additionally, after determining that the transfer from the first node to the second is successful, the first node may remove a data object key, associated with the stored data object, from a key manager of the first node. For example, the first node may remove the data object key from the key manager of the node by the key management module 210 of the first node.

Figure 6:
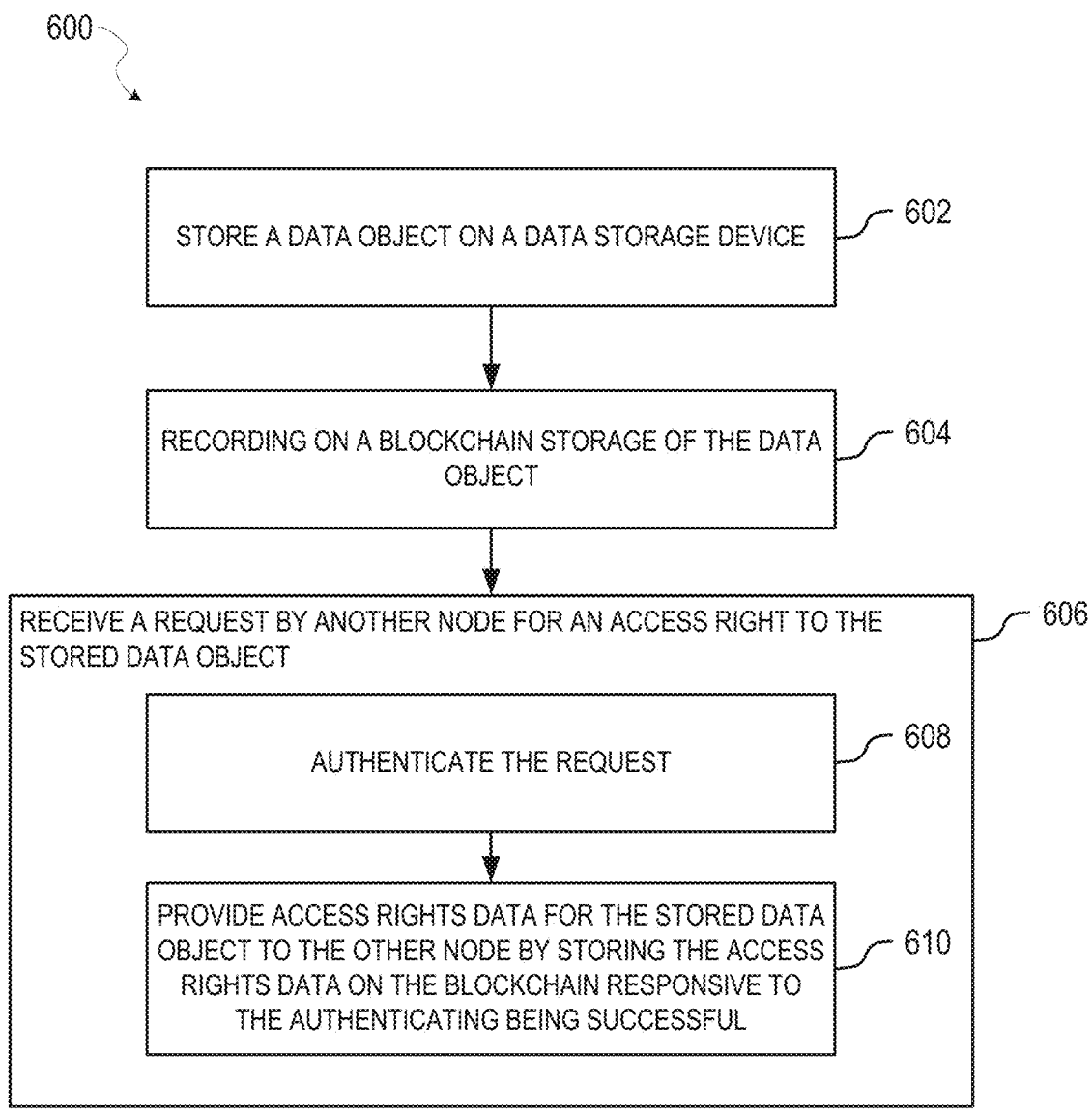

Referring now to the FIG. 6, the method 600 may be performed by a first node, which may be one of the nodes 202 of the data system 200. As shown, the method 600 begins with operations 602 and 604, which according to some embodiments, are respectively similar to operations 302 and 304 of the method 300 described with respect to FIG. 3.

From operation 604, the method 600 continues with operation 606 receiving a request by another node for an access right to the stored data object (e.g., on the data storage device of the first node). The other node may comprise a second node, which may be another one of the nodes 202 of the data system 200. For some embodiments, operation 606 is performed by the data management module 204 of a first node.

Responsive to the request, the method 600 performs operations 608-410. At operation 608, the request is authenticated. For example, the first node may authenticate the request by the authentication module 212 of the first node. For some embodiments, authentication of the request comprises a user associated with the first node being notified of the request (e.g., by the second node) for access rights to the stored data object, the user providing the first node with their user credentials (e.g., login information, biometrics, etc.) responsive to the user's approval of the request, and the first node authenticating those user credentials.

At operation 610, responsive to the authenticating being successfully, access rights data for the stored data object are provided to the other node (e.g., the second node) by storing the access rights data on the blockchain. For example, the first node may store the access rights data on the blockchain by the blockchain module 206 of the first node. By doing so, the access rights data is added (e.g., posted) to the blockchain for subsequent retrieval from the blockchain by the other node. For some embodiments, providing the access rights data to the other node comprises generating access rights data for the stored data object that corresponds to the access right requested by the other node (e.g., by the second node). For example, the first node may generate the access rights data by the authentication module 212 of the first node. Depending on the embodiment, the access rights data may comprise an access right vector, which may be used by the other node (e.g., the second node) in a subsequent request to access the stored data object (e.g., from the first node). Additionally, the access rights data may be encrypted before being provided to the other node (e.g., the second node) using a public key associated with the requester (e.g., the second node public key) to help ensure that only the intended recipient of the access rights data (e.g., the second node) can make use of the access rights data.

Figure 7:
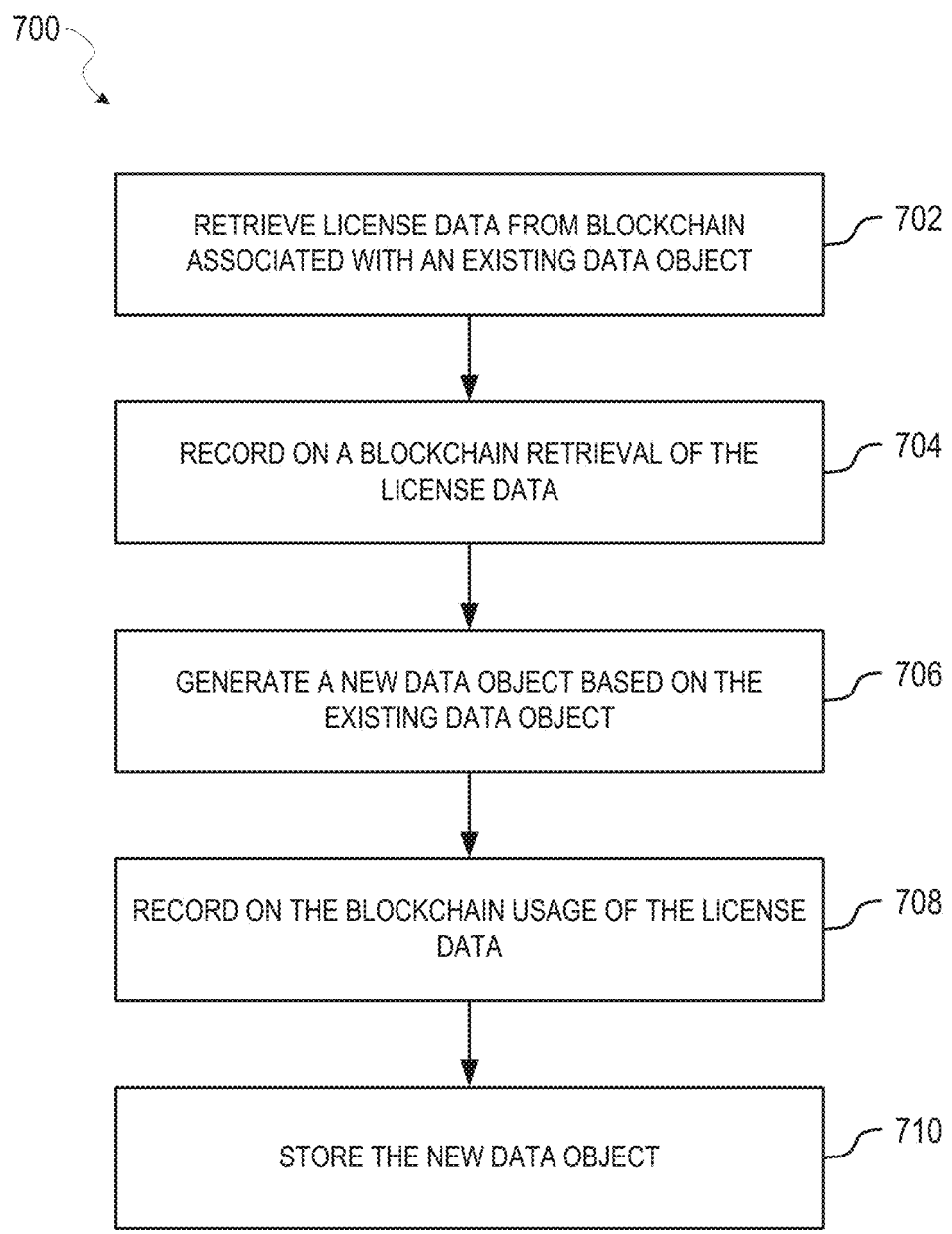

Referring now to the FIG. 7, the method 700 may be performed by a first node, which may be one of the nodes 202 of the data system 200. As shown, the method 700 begins with operation 702 retrieving, from a blockchain, license data associated with an existing data object, which may comprise, for example, such as an electronic form or a business process data object. For example, the first node may retrieve the license data from the blockchain by the blockchain module 206 of the first node. The license data may have been stored on the blockchain by another node that added (e.g., posted) the existing data object for usage by others. The license module of first node may handle the management (e.g., request and receiving) the license data on the first node, and the key management module 210 of the first node may handle storage of the license data on the first node.

As noted herein, some embodiments use an existing data object, such as predesigned or pre-built business process object or electronic form, to generate a new data object (e.g., new business process object or a new electronic form). The existing data object may be subject to a license and, accordingly, some embodiments obtain license data associated with the existing data object prior to the existing data object being used to generate a new data object based on the existing data object. The licensing data may include restriction on usage of the existing data object, such as license expiration parameters, types of usage (e.g., how the existing data object can be used to generate a new data object), how many times the existing data object may be utilized, or who may use the existing data object. By using licensing data, various embodiments can implement a form of digital rights management with respect to predesign or pre-built data objects offered for use by one user to another user, such as through a business process or electronic forms store or catalog.

The method 700 continues with operation 704 recording on the blockchain retrieval (e.g., by the first node) of the license data from the blockchain. For example, the first node may record the retrieval of the license data from the blockchain by the blockchain module 206 of the first node.

The method 700 continues with operation 706 generating (e.g., by the first node) a new data object based on the existing data object. For example, the first node may generate the new data object based on the existing data object by the business process design module 224 of the first node. For some embodiments, the new data object generated may comprise a data object that is derived by modification (e.g., addition, deletion, or change) of a copy of the existing data object. Accordingly, the new data objects may represent ones that have been customized by a user (e.g., advisor, subject matter expert administrator, or system administrator user). As noted herein, the existing data object may be licensable for use in generating a new data object. For example, the new data object may comprise a new electronic form, and the existing data object may comprise an existing electronic form. In another example, the new data object may comprise a new business process object, and the existing data object may comprise an existing business process object.

The method 700 continues with operation 708 recording on the blockchain usage of the license data (e.g., by the first node) retrieved at operation 702. For example, the first node may record the use of the license data on the blockchain by the business process design module 224 of the first node. For some embodiments, the usage of the license data is based on (e.g., responsive to) the generation of the new data object based on the existing data object at operation 706. By recording the use of the license data, the first node can register its use of the existing data object. The license module 220 of the first node may cause the recording of the usage of the license data in response to the usage of the existing data object.

The method 700 continues with operation 710 storing the new data object, generated at operation 706, on the blockchain. For example, the first node may store the new data object generated on the blockchain by the blockchain module 206 of the first node. As noted herein, storing the new data object on the blockchain may permit the first node or another node to make use of the new data object. For instance, where the new data object comprises a new electronic form, the new data object may be used in a subsequent interview session initiated by another node (e.g., the second node). The new data object may be stored with license data associated with the new data object, which as noted herein, can define the restrictions for future usage of the new data object.

Figure 8:
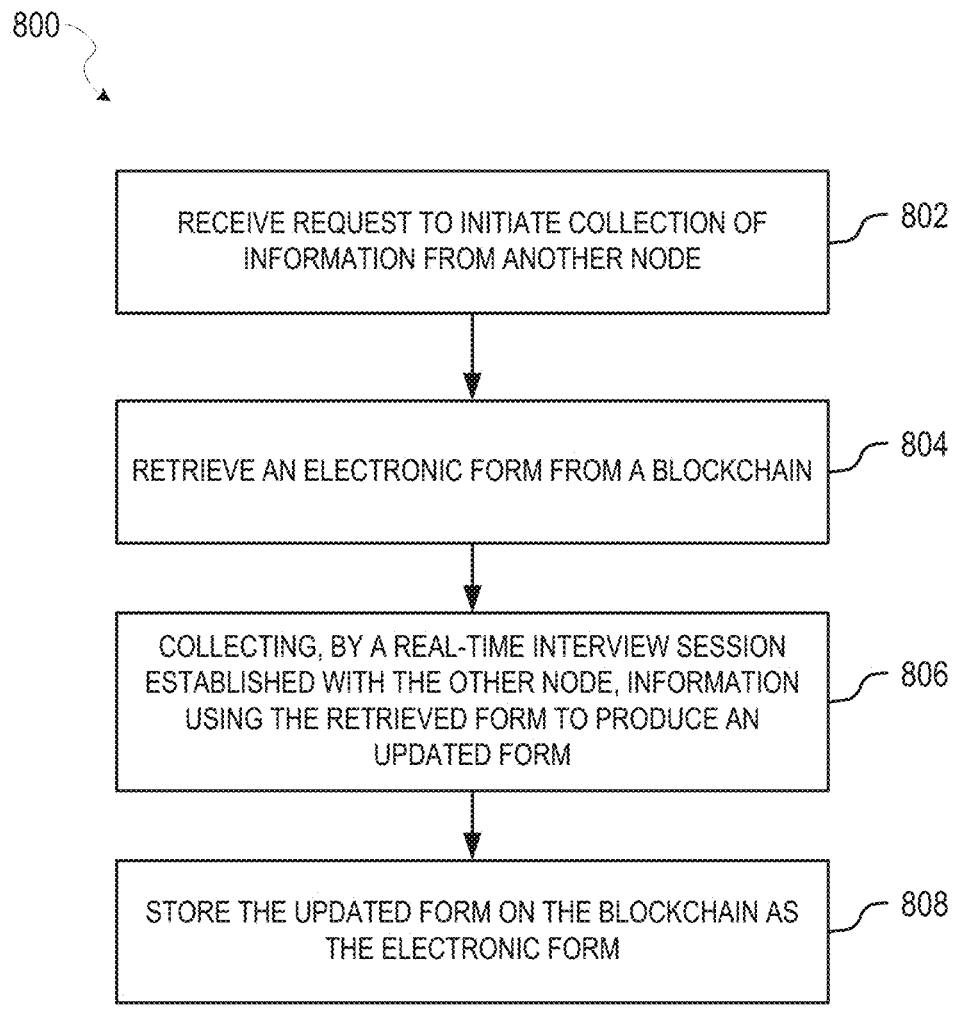

Referring now to the FIG. 8, the method 800 may be performed by a first node, which may be one of the nodes 202 of the data system 200. As shown, the method 800 begins with operation 802 receiving a request to initiate (e.g., at the first node) collection of information from another node (e.g., the second node). For example, the first node may receive the request to initiate the collection of information by the API module 228 of first node, by the form module 216 of the first node, or by a business process by the business process module 218 of the first node.

For various embodiments described herein, a user interface (UI) module of a software application may facilitate or support presentation of a graphical user interface (GUI) to a user of the node 202-1 and enable the user to interact with the GUI, which in turn can result in instructions to be issued to or executed on the node 202-1. The UI module may be part of a software application operating on the node 202-1 or one operating on an entity external to the node 202-1.

The method 800 continues with operation 804 retrieving an electronic form from a blockchain to produce a retrieved form. For example, the first node may retrieve the electronic form from the blockchain by the form module 216 of the first node. For some embodiments, a business process object (e.g., retrieved from the blockchain by the business process module 218 of the first node) determines which electronic form is selected for retrieval from the blockchain. After retrieval of the electronic form, the retrieved form can be launched by the first node, which may cause the electronic form to be sent to, or launched on, another node (e.g., via the form module 216 of the second node) for collection of information.

In one use case, operation 804 may involve the electronic form being retrieved by the first node and a user (e.g., client user) at the first node filling out the electronic form, thereby facilitating collection of data sing the electronic form. The collected data and the electronic may be then stored on the first node, and may be stored as a single entity. In another user case, operation 804 may involve the electronic form being retrieved by the first node associated with a first user (e.g., client user), the retrieved electronic form being served up to another node associated with a second user (e.g., SME user's node), and the first user and the second user filling out the electronic form jointly, such as part of an interactive data collection session (e.g., online and real-time data collection session). Upon updating (e.g., completing) the retrieved electronic form, the updated electronic form may be transferred to the first node, the node of the second user, or both (e.g., updated electronic form may be stored on the SME user's node where the collected data is agreed and permissioned by the client user to belong to the SME user, such as registration data.

The method 800 continues with operation 806 collecting, by a real-time interview session established with the other node (e.g., the second node), information using the retrieved form (retrieved at operation 804) to produce an updated form. For example, the information may be collected from the other node during the real-time interview session, using the electronic form, by the form module 216 of the first node launching the electronic form on the first node, the form module 216 of the second node launching the electronic form, or both. Additionally, the first node may establish (e.g., over a network) the real-time interview session with the second node by an interview module of the first node. The real-time interview session may permit a first user of the first node and a second user of the second node to collaboratively update the electronic form (e.g., enter information requested by the electronic form). The real-time interview session may comprise real-time chat, voice, video, or some combination thereof. Additionally, through the real-time interview session, the first user and the second user may share a shared view of the electronic form as it is being updated by either the first user or the second user. The updated form may comprise the electronic form with information entered by a user through the other node.

The method 800 continues with operation 808 storing the updated form on the blockchain as the electronic form. As a result, operation 808 may replace the existing version of the electronic form on the blockchain, or alternatively add a new version of the electronic form on the blockchain. For example, the first node may store the updated form on the blockchain by the blockchain module 206 of the first node. While the first node may store the update form on the blockchain, for some embodiments, the first node does not store the updated form on a data storage device associated with the first node. Rather, according to some embodiments, the second node (associated with the second user) may store the update form on a data storage device associated with the second node. In this way, the second node can retain management and control of the update form and the information collected therein from the second user of the second node.

The electronic form can be subsequently retrieved by the first node (e.g., with access right permission) or the second node for review purposes, making changes (e.g., corrections) to the information previously entered in the electronic form, or adding additional information to the electronic form. For example, where an advisor user of the first node initiated collection of information from a client user of a second node, a subject matter expert (SME) admin of the first node may subsequently retrieve the electronic form as stored on the blockchain and review the client user's one or more response to the electronic form.

Figure 9:
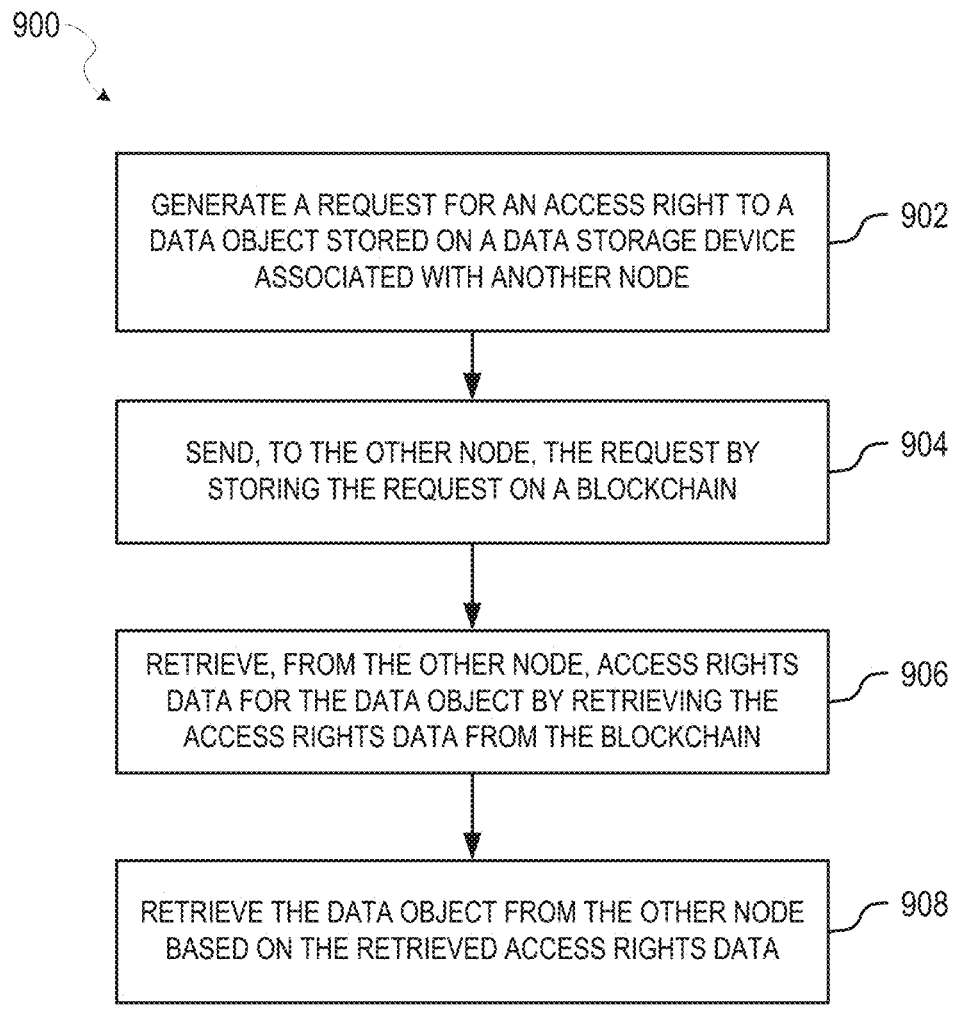
Figure 10:
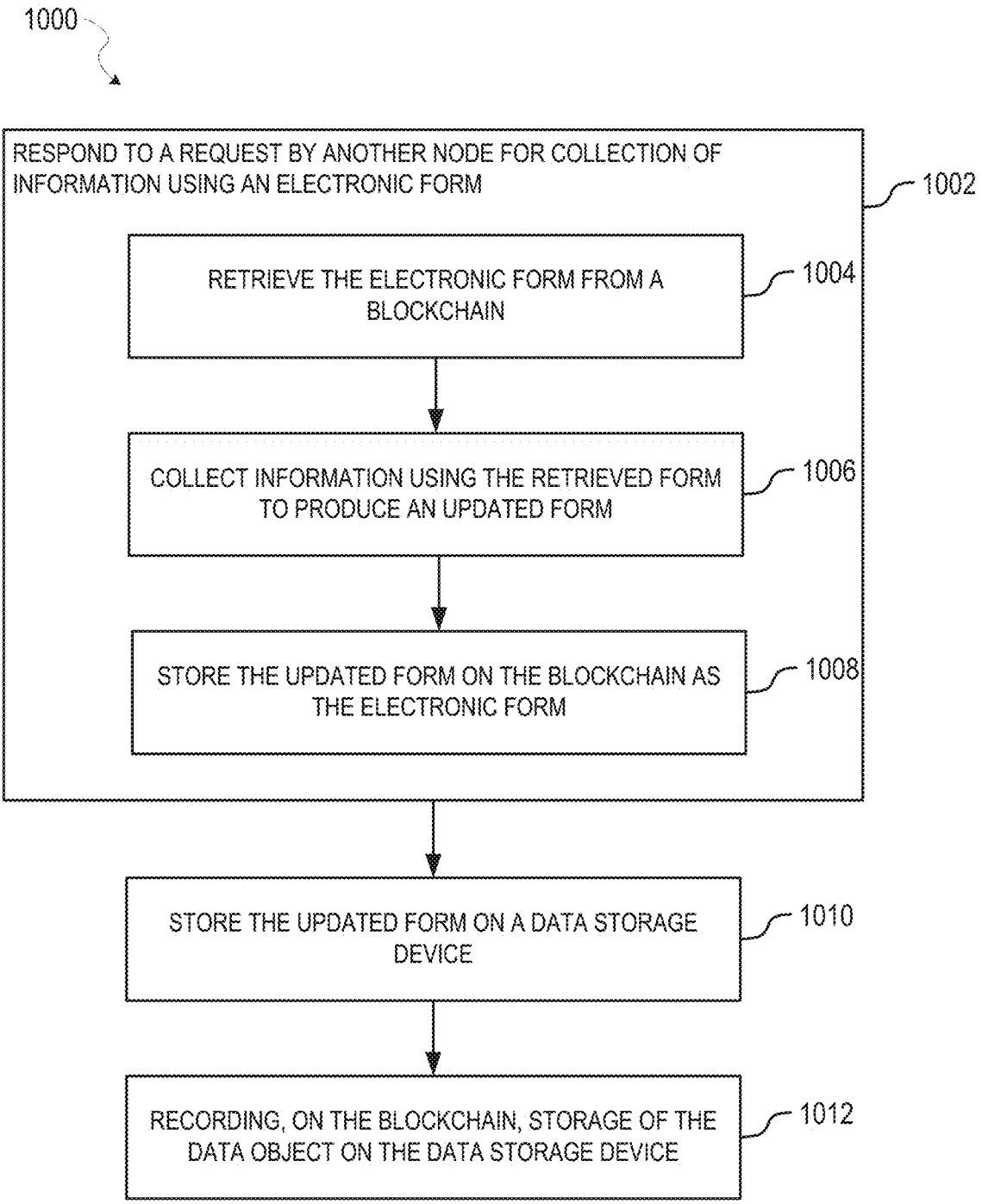

Referring now to the FIG. 9, the method 900 may be performed by a first node, which may be one of the nodes 202 of the data system 200. As shown, the method 900 begins with operation 902 generating a request (e.g., by the first node) for an access right to a data object stored on a particular data storage device associated with another node (e.g., a second node), where the other node is associated with another user. The other node may comprise a second node, which may be one of the nodes 202 of the data system 200 and associated with a second user. For example, the first node may generate the request for the access right by the APT module 228 of the first node. Generating the request for the access right may comprise encrypting the request by the second node public key associated with the second node prior to storage of the request to the blockchain, which can help ensure that the request is only receivable by the second node.

The method 900 continues with operation 904 sending, to the other node, the request for the access right by storing the request for the access right on a blockchain. For example, the first node may send the request for the access right to the second node by storing the request on the blockchain by the blockchain module 206 of the first node. By storing the request on the blockchain, the first node may be adding (e.g., posting) the request to the blockchain for subsequent retrieval by the second node, which can process the retrieved request and respond appropriately. For example, the second node may respond by providing the first node with access rights data for the stored data object on the second node. This may be performed by the second node in a manner similar to operation 606 of the method 600 described with respect to FIG. 6.

The method 900 continues with operation 906 retrieving (e.g., at the first node) access rights data for the data object from the other node (e.g., the second node) by retrieving the access rights data from the blockchain. For example, the first node may retrieve the access rights data from the blockchain module by the blockchain module 206. For some embodiments, the access rights data retrieved from the blockchain is stored on the blockchain by the other node (e.g., the second node) in response to the request (e.g., from the first node). More regarding a node responding to the request is described herein with respect to operation 606 of FIG. 6.

As noted herein, the access rights may comprise an access right vector, which may be used by the other node (e.g., the second node) in a subsequent request to access the stored data object (e.g., from the first node). Additionally, the access rights data may be encrypted before being provided by the other node (e.g., the second node) using a public key associated with the requester (e.g., the first node public key) to help ensure that only the intended recipient of the access rights data (e.g., the first node) can make use of the access rights data.

The method 900 continues with operation 908 retrieving (e.g., at the first node) the data object from the other node (e.g., the second node) based on the access rights data retrieved at operation 906. For example, the first node may retrieve the data object from the other node based on the access rights data by the data management module 204 of the first node. The data management module 204 may receive the access rights data from the blockchain module 206, and send a request to the second node to send a copy of the data object to the first node. For some embodiments, this may cause the data management system of the first node to communicate with the data management system of the second node (e.g., directly or via the blockchain), which can facilitate a peer-to-peer exchange of the data object between the two data management systems. Subsequent to the retrieval of the data object by the first node from the second node, for some embodiments, the second node retains management and control of the data object. For some embodiments, the first node may retain a copy of the retrieved data object for certain duration (e.g., while reviewing the data object), but does not store a data object on the data storage device of the first node or manage/control the data object.

The retrieved data object comprises a copy of the data object, which may be provided (e.g., via the API module 228) to the requester (e.g., a software application that caused the request to retrieve the data object). For some embodiments, before the retrieved data object is provided by the first node for use (e.g., to a software application via the API module 228), the first node retrieves, at the first node, a hash of the stored data object from the blockchain to produce a retrieved hash. The first node may validate the retrieved hash and, responsive to the validating of the retrieved has being successful, the successful retrieval of the data object may be recorded on the blockchain. Additionally, responsive to the validating of the retrieved has being successful, the retrieved data object may be provided to the requester. Additionally, Referring now to the FIG. 10, the method 1000 may be performed by a first node, which may be one of the nodes 202 of the data system 200. As shown, the method 1000 begins with operation 1002 responding (e.g., at a first node) to a request by another node (e.g., a second node) for collection of information using an electronic form including a set of fields. To respond to the request, operation 1002 performs operations 1004-1008. At operation 1004, the electronic form is retrieved (e.g., at the first node) from a blockchain to produce a retrieved form. At operation 1006, information is collected (e.g., at the first node) using the retrieved form to produce an update form. As described herein, the information may be collected from a first user associated with the first node. At operation 1008, the updated form resulting by operation 1006 is stored on the blockchain as the electronic form. As a result, operation 1006 may replace the existing version of the electronic form on the blockchain, or alternatively add a new version of the electronic form on the blockchain. The electronic form can be subsequently retrieved for review purposes, making changes (e.g., corrections) to the information previously entered, or adding additional information to the electronic form.

The method 1000 continues with operation 1010 storing, as a data object, the updated form on a data storage device (e.g., of the first node) to produce a stored data object on the data storage device. The method 1000 continues with operation 1012 recording, on the blockchain, storage of the data object on the data storage device, where the recording comprises storing a hash of the data object on the blockchain to produce a stored hash in the blockchain. Operations 1010 and 1012 may be similar to operations 302 and 304 of the method 300 described with respect to FIG. 3.

Figure 11:
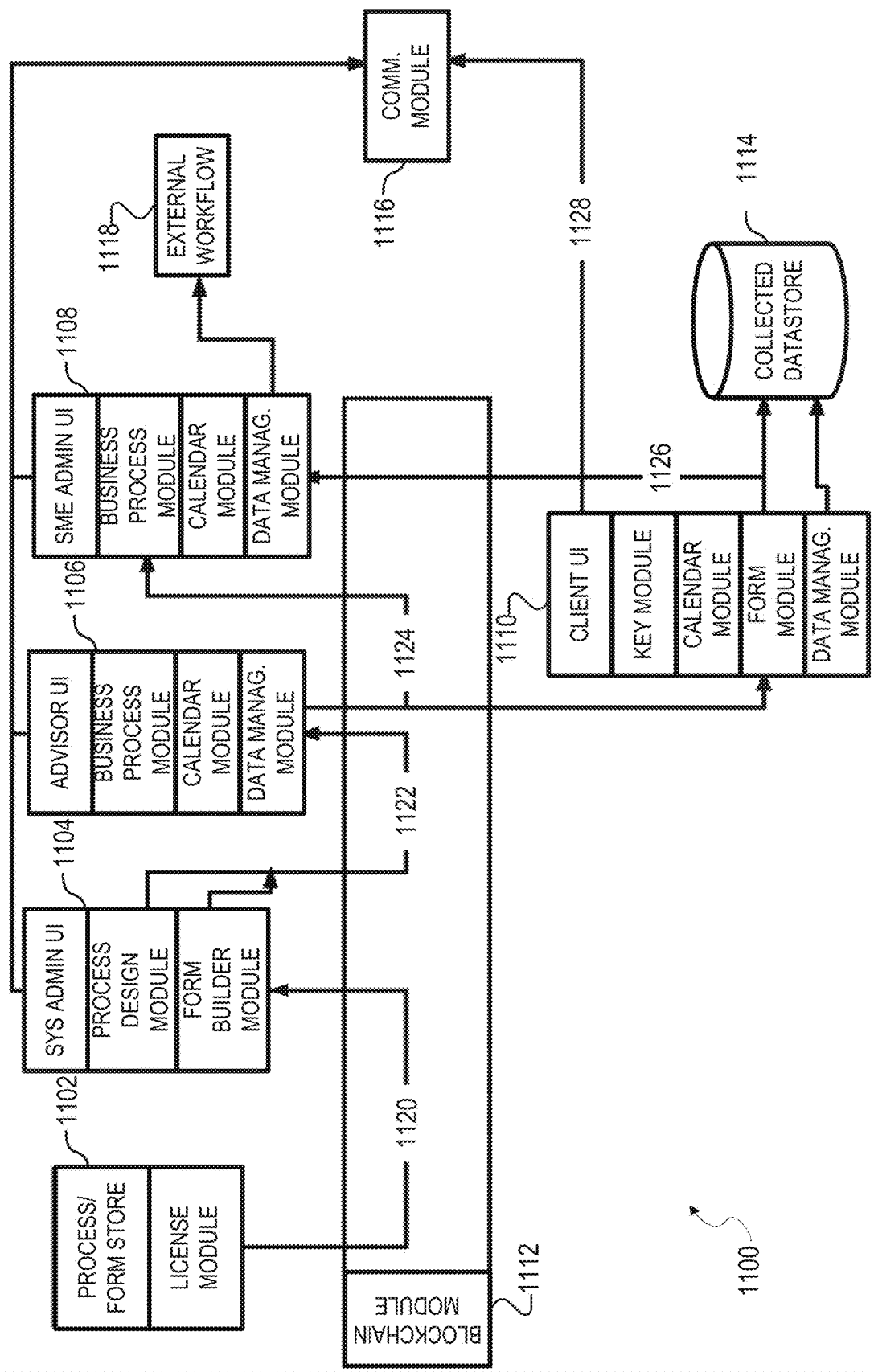
FIG. 11 is a flow chart illustrating an example data flow within an example data collection system with a blockchain, according to some embodiments.

FIG. 11 is a flow chart illustrating an example data flow 1100 within an example data collection system (e.g., 200) with a blockchain, according to some embodiments. In FIG. 11, entities 1102, 1104, 1106, 1108, and 1110 each represent a different role within the data collection system. The entities 1104, 1106, and 1108 may comprise a single node (e.g., one of the nodes 202) associated with a single organization and being accessed by different users of the single organization. The entity 1110 may comprise a single node (e.g., another one of the nodes 202) associated a client user. The entity 1102 may comprise a single node associated with a service provider of the data collection system.

According to some embodiments, the entity 1102 represents repository of existing data objects (e.g., predesigned/pre-built electronic forms or business process objects), from which users of the data collection system can generate new data objects on the data collection system. The entity 1102 includes process/form store to provide existing business process objects and electronic forms for generation of new business process objects and new electronic forms. The 1102 also includes a license module to provide licensing data that permits usage of existing data objects in generation of new data objects.

Within the data system, the entity 1104 represents a user having a system administrator role, the entity 1106 represents a user having an advisor role, the entity 1108 represents a user having a subject matter expert (SME) administrator role, and the entity 1110 represents a user having a client role. The entity 1104 includes a system administrator user interface for a system admin user, a process design module to generate new business process objects, and a form build module to generate new electronic forms. The entity 1106 includes an advisor user interface for an advisor user, a business process module to launch/perform a business process based on a business process object, a calendar module to track time and data commitments with respect to a launched business process, and a data management module to handle management of data objects used (e.g., collected or retrieved) by a launched business process. The entity 1108 includes a SME administrator user interface for a SME admin user, a business process module to launch/perform a business process based on a business process object, a calendar module to track time and data commitments with respect to a launched business process, and a data management module to handle management of data objects used by a launched business process. The entity 1110 includes a client user interface for a client user, a key module that facilitate encryption/decryption of data objects, a calendar module to track time and data commitments with respect to a launched business process, a form module that facilitates the user to enter information into an electronic form, and a data management module to handle management of data objects resulting from information collected from the client user. As shown, information collected through the entity 1110 can be stored in a collected datastore 1114.

As shown, a blockchain module 1112 can facilitate operations with respect to a blockchain, which facilitates data flow between the different roles. The blockchain module 1112 may be similar to the blockchain module 206 described with respect to FIG. 2. A communication module 1116 can facilitate communications (e.g., message threads) between multiple users having different roles (e.g., system administrator, advisor, client, etc.) within the data collection system, which may participate in a business process or electronic form launched within the data collection system. The communication module 1116 may be similar to the communication module 226 described with respect to FIG. 2.

Data flows 1120 through 1128 represent example data flows through the data collection system during operation. By data flow 1120, existing data objects (e.g., predesigned/pre-built electronic forms and business process objects), and their accompanying licensing data, may be registered and stored on the blockchain through the blockchain module 1112. Subsequently, those registered data objects can be retrieved from the blockchain by the entity 1104 to generate new data objects, such new business process objects by the process design module or new electronic forms by the form builder module. The new business process objects or new electronic forms may be ones customized by a system admin user.

By data flow 1122, one or more new data objects generated by the entity 1104 can be registered and stored on the blockchain through the blockchain module 1112. Subsequently, the entity 1106 can retrieve those new data objects (e.g., business process objects or electronic forms) from the blockchain and use them to launch a business process (e.g., client engagement process by an advisor user according a retrieved business process object) or launch an electronic form (e.g., in accordance with a launched business process). The launched business process or electronic form is registered with the blockchain through the blockchain module 1112 by data flow 1124. As shown, through the blockchain, a launched business process can involve participation by a SME admin user at the entity 1108 and a launched electronic form can be sent to the entity 1110 for completion by a client user at the entity 1110. By the data flow 1126, the electronic form as updated by the client user (e.g., updated with information collected from the client user) at the entity 1110 may be stored on the collected datastore 1114, which can represent a data storage device under management and control of the client user. Additionally, the update to the form by the entity 1110 may be recorded on the blockchain, which can then be received by the entity 1108 for review and approval/rejection by a SME admin user. The data flow 1128 represents communications between one or more during various operations of the data collection system.

As shown, information collected by a form updated by a client user (at the entity 1110) may be extracted from the updated form and provided to an external workflow 1118 (e.g., external to the data collection system. Alternatively, information collected by the form may be accessed as needed from the form without extraction and storage of that information elsewhere. Additionally, information collected by be never exposed to another but, rather, tested for a desired condition using a blockchain based algorithm (e.g., smart contract), such as by a Zero Knowledge mechanism.

Figure 12:
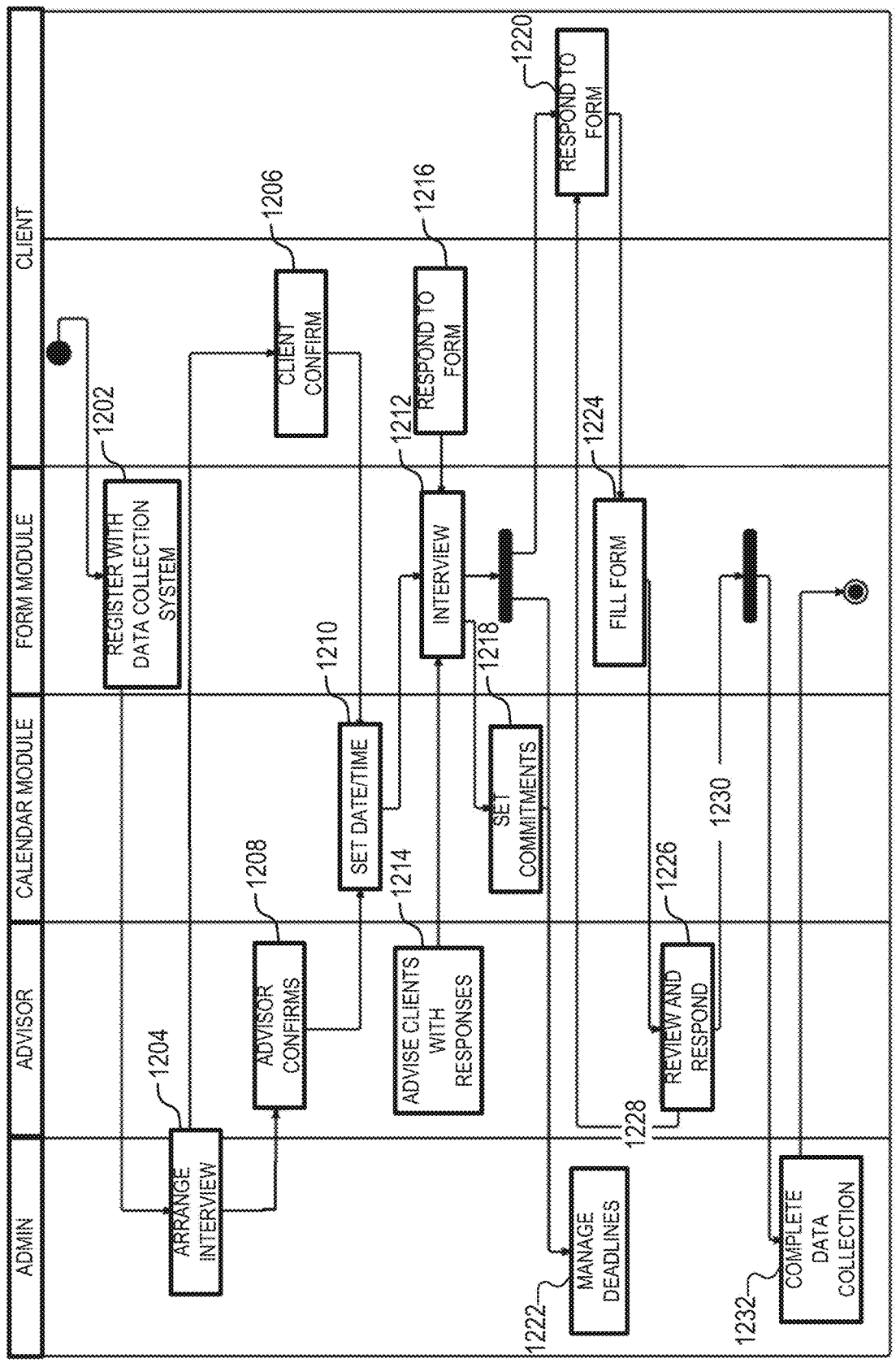
FIG. 12 is a flow chart illustrating an example interview session for collecting data by an electronic form, according to some embodiments.

FIG. 12 is a flow chart illustrating an example interview session for collecting data by an electronic form, according to some embodiments. As shown, the interview session begins at operation 1202 with a client registering as a client user with a data collection system (e.g., 200) using an electronic form. The registering may comprise a client filling out a questionnaire or signing a service agreement for the data collection system. Next, at operation 1204, an admin user arranges (e.g., time and date for) an interview session between the client user and an advisor user. From operation 1204, at operation 1206, a client user confirming (or rejecting/counter-proposing) a time or date for the interview session arranged by the admin user. Additionally, from operation 1204, an advisor user (e.g., intending to conduct the interview session) confirms rejects/counter-proposes the interview session arranged by the admin user. Once the advisor user and the client user confirm the arranged interview session, the time or date is set for each user's calendar via a calendar module.

Subsequently, the interview session is launched and conducted at operation 1212 using one or more electronic forms, which as described herein may be selected based on a business process launched by the advisor user to provide a service to the client user (e.g., tax preparation or document preparation). For some embodiments, the interview session comprises a real-time interview session (e.g., established between a first node of the admin user and a second node of the client user) that permits both the advisor user and the client user to collaboratively view and enter information into the electronic form. During the interview session, by operation 1214, the advisor user advises the client user with responses to the electronic form and, by operation 1216, the client user can respond to one or more fields of the electronic form (e.g., enter information into text fields, selection check boxes, selecting selections from drop down boxes, selecting items in a list, etc.). The electronic form may represent an initial interview questionnaire to which the client user is intended to respond. Those response to the initial interview questionnaire may determine (e.g., drive) additional requests of information that need responses from the client user.

Based on the client user's responses to the electronic field, at operation 1218, one or more additional time or date commitments may be set on the calendar of one or both of the advisor user and the client user. The admin user may assist with managing user deadlines at operation 1222. Additionally, at operation 1220, the client user may respond to one or more electronic forms or requests for additional information, which may be based on the client user's responses to the electronic form (at operation 1216). The client user responds to the one or more electronic forms/requests after the interview session has ended and without real-time assistance from the advisor user through the interview session. The client user may provide the additional information at operation 1220 by responding to the one or more electronic forms/request at operation 1224.

At operation 1226, the advisor user reviews the client user's responses to the one or more electronic forms/requests, and the advisor user responds to the client user's responses. If the advisor user rejects one or more of the client user's responses, the one or more forms/requests may be returned to the client user (at operation 1228) for one or more additional/modified responses. If the advisor user approves the client user's responses, at operation 1230 the electronic forms responded to by the client user are marked as completed. At operation 1232, the data collection is completed by admin user, which may involve data collected by the electronic forms being extracted for use by one or more other business processes (e.g., completion of tax filing documents or corporate filing documents).

Figure 13:
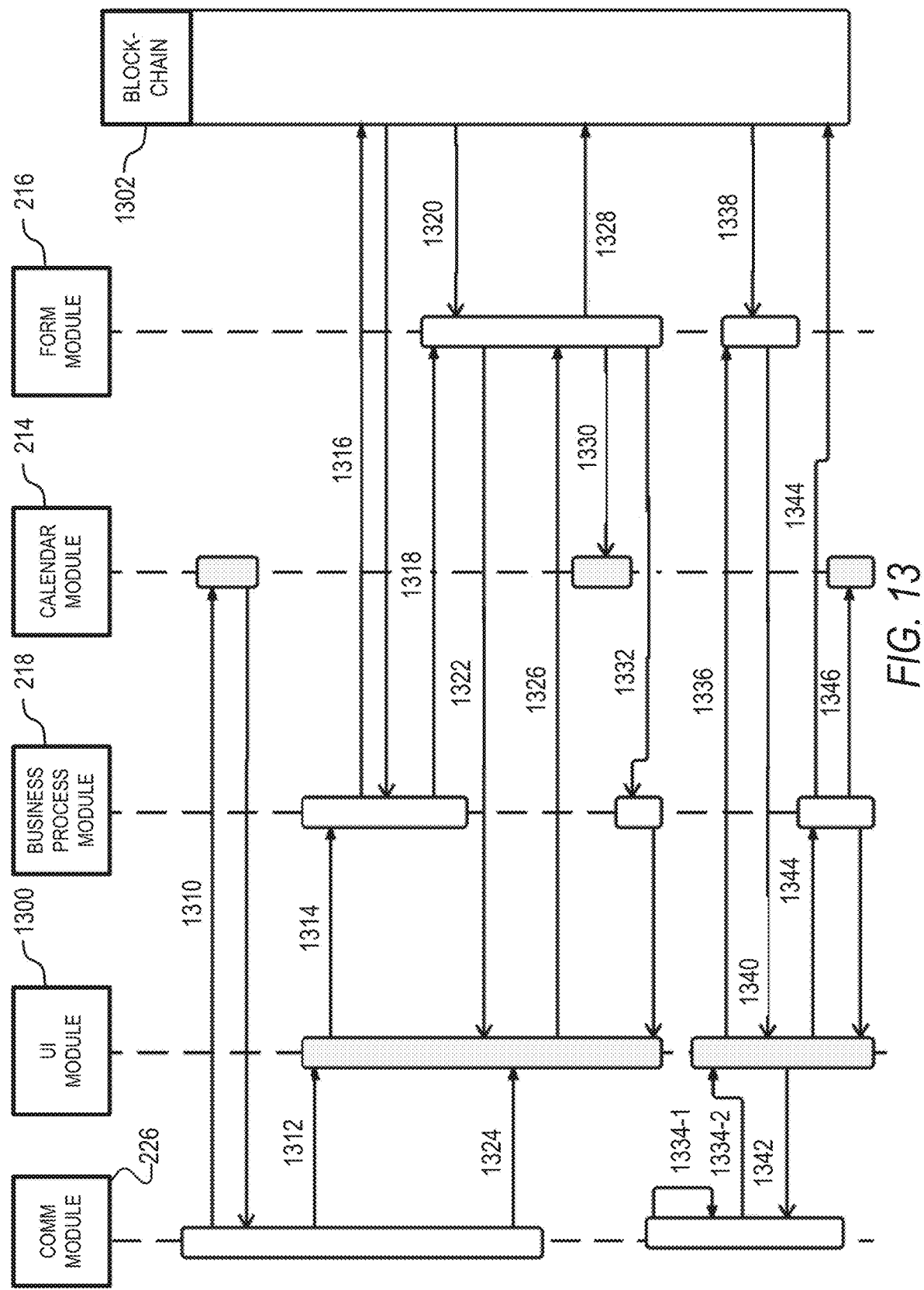
FIGS. 13-21 are flow charts illustrating example operations of an example data collection system with a blockchain, according to some embodiments.

FIGS. 13-21 are flow charts illustrating example operations of the data collection system 200 with a blockchain, according to some embodiments. In particular, FIG. 13 illustrates operations with respect to an example node of the data collection system 200, where the node comprises the communication module 226, a user interface (UI) module 1300, the business process module 218, and the calendar module 214. The node has access (e.g., write data to or read data from) to a blockchain 1302, which may be facilitated by the blockchain module 206 (not shown) included by the node.

According to some embodiments, FIG. 13 represents one or more operations of the data collection system 200 that may be performed by a node associated with an advisor user (e.g., SME advisor). At operation 1310, through the communication module 226, the user can cause the calendar module 214 to facilitate scheduling of an interview session. At operation 1312, through the UI module 1300, the user can cause the interview session to launch (e.g., at the scheduled time), which in turn, causes the business process module 218 to launch a business process at operation 1314. In order to do so, at operation 1316, the business process module 218 looks up and retrieves a business process object from the blockchain 1302. Based on the launched business process, the business process module 218 instructs the form module 216 to look-up and retrieve an electronic form from the blockchain 1302, which the form module 216 can load and display to the user (through the UI module 1300) at operation 1322. Through the UI module 1300, the user can initiate the interview session at operation 1324.

Once collection of information (e.g., from a client user at another node) using the loaded electronic form is completed at operation 1326, the form module 216 stores the resulting (updated) electronic form on the blockchain 1302. Based on the updated form, at operation 1330, the form module 216 updates (through the calendar module 214) one or more calendar commitments (e.g., calendar events, reminders, tasks, etc.) of the one or more users participating in the interview session. Additionally, the form module 216 informs the business process module 218 of the completion of the interview at operation 1332. The business process module 218, in turn, notifies the user regarding the completion of the interview process (through the UI module 1300).

Thereafter, the user may communicate with one or more other users through the communication module 226 at operation 1334-1. Once the user indicates through the UI module 1300 that the electronic form is complete at operation 1334-2, at operation 1336, the UI module 1300 causes the form module 216 to retrieve the completed form from the blockchain 1302. At operation 1338, the form module 216 retrieve the completed form from the blockchain 1302, and loads and displays to the user (through the UI module 1300) the completed form at operation 1340. Based on their review of the completed electronic form loaded through the UI module 1300, the user can approve or reject the completed form. At operation 1342, the user rejects the completed form through the UI module 1300 and the user is returned to the communications module 226 (e.g., to communicate their reasons for rejecting the completed form to the client user).

Alternatively, at operation 1344, the user approves the completed form through the UI module 1300 and, in response to the approval, the business process module 218 moves to the next stage of the business process by adding (e.g., posting) the user's approval to the blockchain 1302 at operation 1344 and updating (through the calendar module 214) one or more calendar commitments (e.g., calendar events, reminders, tasks, etc.) of the one or more users participating in the interview session.

Figure 14:
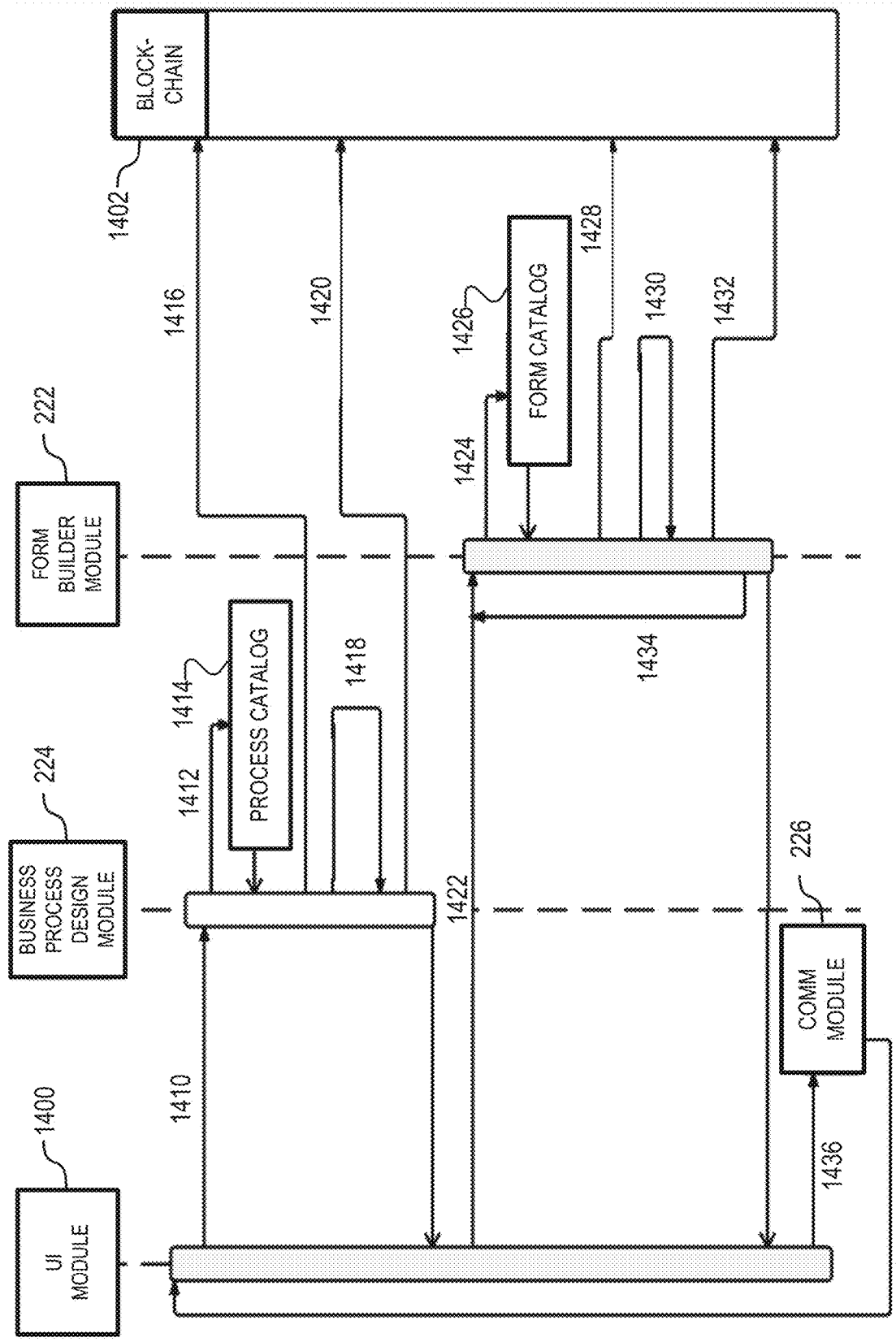

FIG. 14 illustrates operations with respect to an example node of the data collection system 200, where the node comprises a UI module 1400, the business process design module 224, and the form builder module 222. The node has access (e.g., write data to or read data from) to a blockchain 1402, which may be facilitated by the blockchain module 206 (not shown) included by the node.

According to some embodiments, FIG. 14 represents one or more operations of the data collection system 200 that may be performed by a node associated with a system admit) user during generation of a new business process object and a new electronic form. At operation 1410, through the UI module 1400, the user can cause the business process design module 224 to look-up and retrieve an existing business process object (at operation 1412) from a process catalog 1414. The process catalog 1414 may comprise of predesigned or pre-built business process objects previously generated by other users or generated by the current user. At operation 1416, the business process design module 224 registers license of the existing business process object retrieved by operation 1412. At operation 1418, the business process design module 224 generates the new business process object based on the existing business process object. Once design or modification of the new business process object is completed by the user, at operation 1420, the new business process object is stored on the blockchain 1402.

At operation 1422, through the UI module 1400, the user can cause the form builder module 222 to look-up and retrieve an existing electronic form (at operation 1424) from a form catalog 1426. The form catalog 1426 may comprise of predesigned or pre-built electronic forms previously generated by other users or generated by the current user. At operation 1428, the form builder module 222 registers license of the existing electronic form retrieved by operation 1424. At operation 1430, the form builder module 222 generates the new electronic form based on the existing electronic form. Once design or modification of the new electronic form is completed by the user, at operation 1432, the new electronic form is stored on the blockchain 1402.

At operation 1436, the user may communicate with other users of the node through the communication module 226, and this may result in additional design requests with respect to the design of business process objects or electronic forms.

Figure 15:
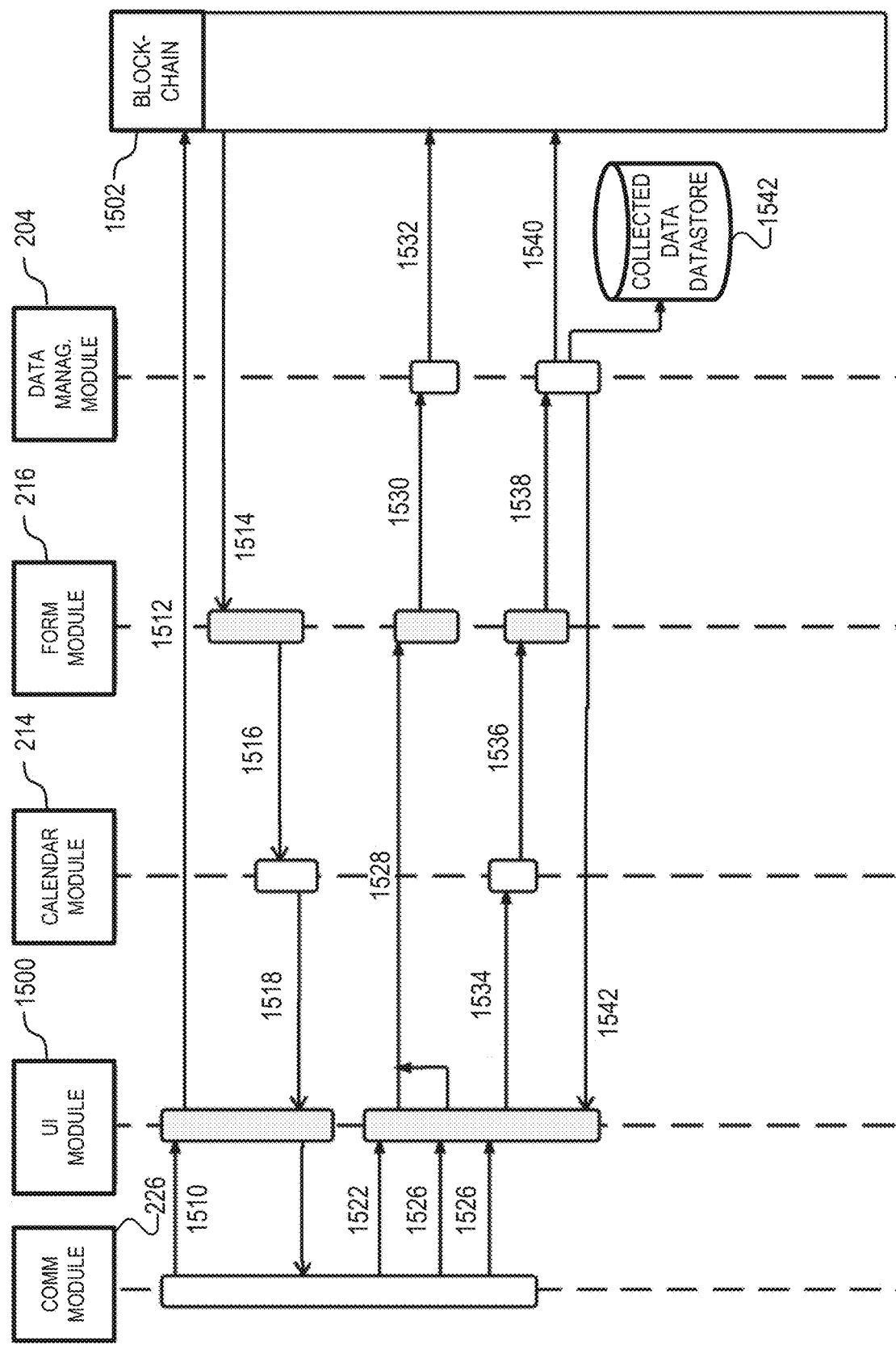

FIG. 15 illustrates operations with respect to an example node of the data collection system 200, where the node comprises the communication module 226, a UI module 1500, the calendar module 214, the form module 216, and the data management module 204. The node has access (e.g., write data to or read data from) to a blockchain 1502, which may be facilitated by the blockchain module 206 (not shown) included by the node.

According to some embodiments, FIG. 15 represents one or more operations of the data collection system 200 that may be performed by a node associated with a client user during data submission by the client user (e.g., outside an interview session). At operation 1510, through the UI module 1500, the user can respond to request (e.g., from an advisor user) for collection of information. At operation 1514, an electronic form associated with the request is retrieved by the form module 216 and loaded by the form module 216 at operation 1516. Additionally, at operation 1518, the calendar modules 214 provides the UI module 1500 with one or more commitments for user in connection with the request, which the UI module 1500 displays for the user's review and response. For example, at operation 1522, the user may respond to a commitment reminder through the UT module 1500. At operation 1526, the user may reject a commitment (e.g., task) through the UI module 1500 or, alternatively, at operation 1526, the user accepts a commitment through the UI module 1500.

If the user accepts a commitment at operation 1526 through the UI module 1500, at operation 1528, the user fills out some or all of the electronic form retrieved by the form module 216, which results in an updated form. After the user is finished filling out the electronic form, the form module 216 causes the data management module 204 to store the updated form to the blockchain 1502 at operation 1532.

Further, if the user accepts a commitment at operation 1526 through the UI module 1500, at operation 1534, one or more commitments of the users involved in the information collection (e.g., the client user and the advisor user) may be updated by the calendar module 214. Upon another user (e.g., reviewing user, such an advisor user) approved the updated form (e.g., as stored to the blockchain at operation 1532), at operation 1538, the form module 216 instructs the data management module 204 to store the information collected in the updated form to a collected data datastore 1542 associated with the user (e.g., the data storage device associated with the node of the client user). Additionally, at operation 1538, the data management module 204 log completion of the electronic form on the blockchain 1502 and, at operation 1542, indicates to the user that the electronic form is now closed through the UI module 1500.

Figure 16:
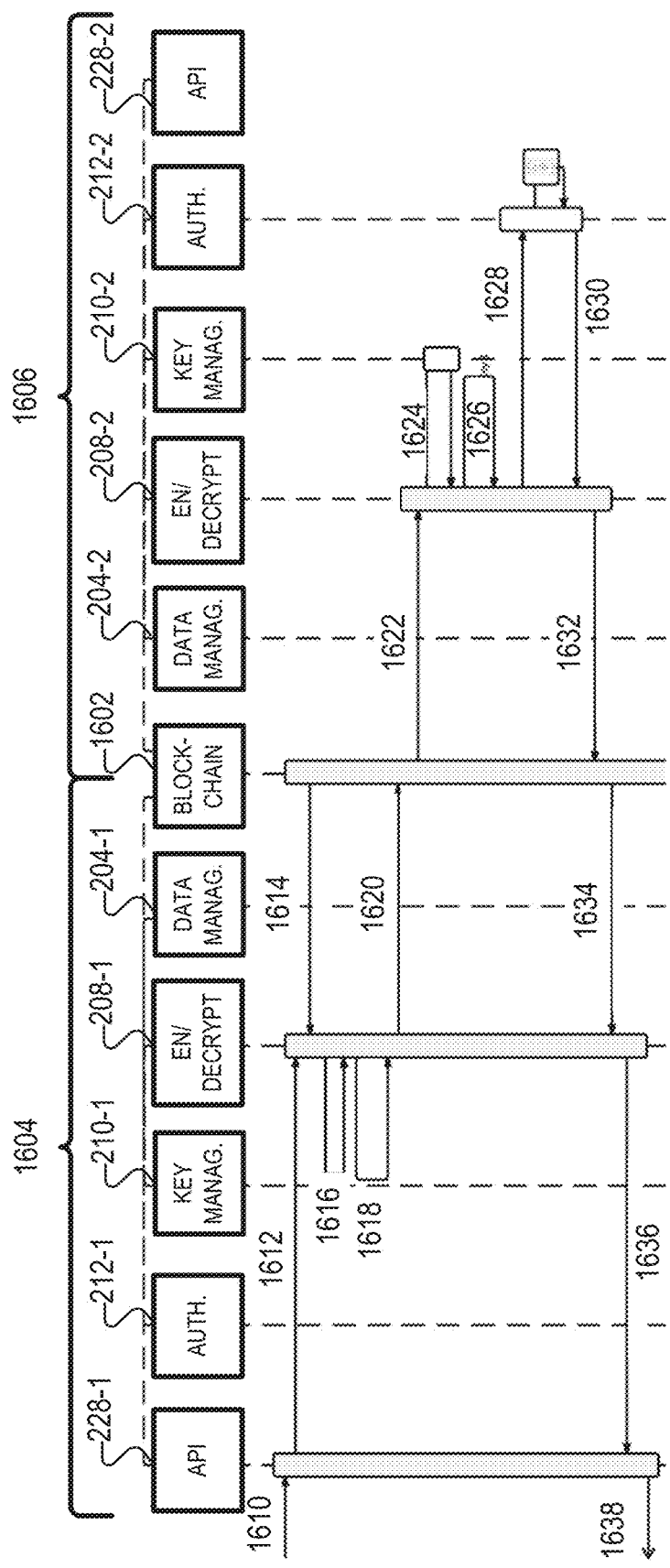

FIG. 16 illustrates operations with respect to example nodes 1600-1 and 1600-2 of the data collection system 200. For various embodiments described herein, the node 1600-1 represents the first node and the node 1600-2 represents the second node. As shown, each of the nodes 1600-1, 1600-2 comprises their own instance of the API module 228, the authentication module 212, the key management module 210, the encryption/decryption module 208, and the data management module 204. The nodes 1600-1, 1600-2 have access (e.g., write data to or read data from) to a (common) blockchain 1602, which may be facilitated by an instance of the blockchain module 206 (not shown) included by each of the nodes 1600-1, 1600-2.

According to some embodiments, FIG. 16 represents one or more operations of the data collection system 200 that may be performed by first and second nodes when the first node requests access rights to a data object (e.g., all the data objects) of the second node. At operation 1610, a software application (on or external to the node 1600-1) requests, through the API module 228-1, access rights to a data object stored with respect to the node 1600-2. At operation 1612, the encryption/decryption module 208-1 encrypts the request. To achieve this, at operation 1614, the encryption/decryption module 208-1 retrieves a public key associated with the node 1600-2 from the blockchain 1602 and, at operation 1616, the encryption/decryption module 208-1 retrieves a private key associated with the node 1600-1 from the key management module 210-1. Subsequently, at operation 1618, the encryption/decryption module 208-1 encrypts the request by the private key of the node 1600-1 to produce a first encrypted request, and then encrypts the first encrypted request by the public key of the node 1600-2 to produce a second encrypted request. At operation 1620, the second encrypted request is added (e.g., posted) to the blockchain 1602.

Thereafter, at operation 1622, the node 1600-2 retrieves the second encrypted request added (e.g., posted) to the blockchain 1602 by the node 1600-1. Additionally, at operation 1622, the encryption/decryption module 208-2 retrieves a public key associated with the node 1600-1 from the blockchain 1602. To decrypt the second encrypted request retrieved from the blockchain 1602, at operation 1624, the encryption/decryption module 208-2 2 retrieves the private key associated with the node 1600-2 from the key management module 210-2. At operation 1626, the encryption/decryption module 208-2 decrypts the second encrypted request by the private key associated with the node 1600-2 to produce a first decrypted request, and then decrypts the first decrypted request by the public key associated with the node 1600-1 to produce a second decrypted request. According to some embodiments, the second decrypted request that results is contains the same data content as the original request encrypted by the encryption/decryption module 208-1 of the node 1600-1.

At operation 1628, the second decrypted request is submitted the authentication module 212-2 for authentication by a user at the node 1600-2. For some embodiments, a user at the node (e.g., the node 1600-2) provides their approval to a request for access rights to a data object (or some other request) by authenticating the request using their user credentials (e.g., login, password, biometrics, etc.). In this way, a failure to authenticate (e.g., by user refusing authentication) the request may be interpreted as a rejection of the request. Upon successful authentication, the authentication module 212-2 can generate access rights data (e.g., comprising an access rights vector) to the data object for the node 1600-1.

At operation 1630, the access rights data is encrypted by the encryption/decryption module 208-2. The access rights data may be encrypted by the public key associated with the node 1600-1. Subsequently, at operation 1632, the encrypted access rights data are added (e.g., posted) to the blockchain 1602. Additionally, at operation 1632, the node 1600-2 may add (e.g., post) a confirmation of the access right permission, which may also be encrypted using the public key associated with the node 1600-1.

At operation 1634, the node 1600-1 retrieves an encrypted confirmation of the access rights being granted, and may also retrieve the encrypted access rights data from the blockchain 1602. At operation 1636, the encryption/decryption module 208-1 decrypts the encrypted confirmation of the access rights using the private key associated with the node 1600-1 and sends the decrypted confirmation of the access rights to the API module 228-1. At operation 1638, the API module 228-1 send a confirmation to the software application that originally submitted the request for access rights at operation 1610. At operation 1636, the encryption/decryption module 208-1 may also decrypt the encrypted access rights optionally retrieved from the blockchain 1602 at operation 1634.

Figure 17:
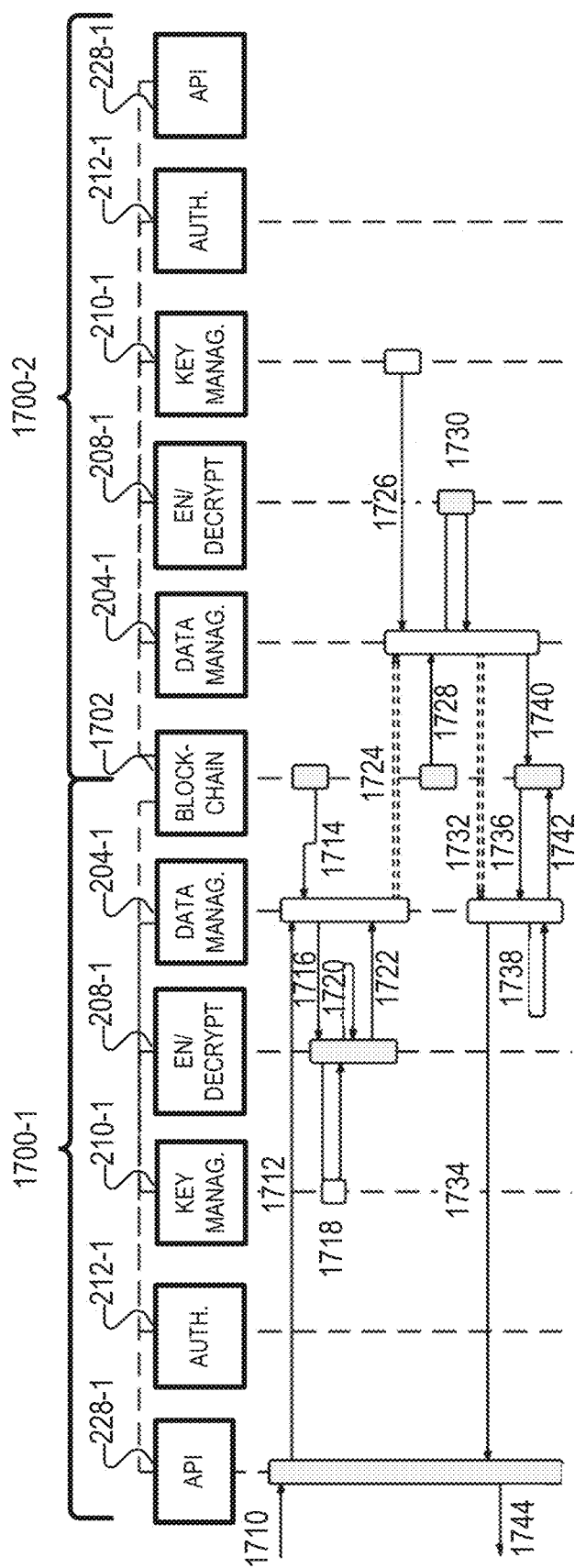

FIG. 17 illustrates operations with respect to example nodes 1700-1 and 1700-2 of the data collection system 200. For various embodiments described herein, the node 1700-1 represents the first node and the node 1700-2 represents the second node. As shown, each of the nodes 1700-1, 1700-2 comprises their own instance of the API module 228, the authentication module 212, the key management module 210, the encryption/decryption module 208, and the data management module 204. The nodes 1700-1, 1700-2 have access (e.g., write data to or read data from) to a (common) blockchain 1702, which may be facilitated by an instance of the blockchain module 206 (not shown) included by each of the nodes 1700-1, 1700-2. For some embodiments, the operations of FIG. 17 are performed subsequent to the operation of FIG. 16 being performed.

According to some embodiments, FIG. 17 represents one or more operations of the data collection system 200 that may be performed by first and second nodes when the first node requests retrieval of a data object from the second node. At operation 1710, a software application (on or external to the node 1700-1) requests, through the API module 228-1, retrieval of a data object from the node 1700-2. At operation 1712, the data management module 204-1 receives the request to retrieve the data object from the node 1700-2. At operation 1714, the data management module 204-1 retrieves, from the blockchain 1702, encrypted access rights data for access to the data object by the node 1700-1. At operation 1716, the encryption/decryption module 208-1 is requested to decrypt the encrypted access rights data (e.g., comprising an encrypted access rights vector). At operation 1718, the encryption/decryption module 208-1 retrieve a private key associated with the node 1700-1 from the key management module 210-1. At operation 1720, the encryption/decryption module 208-1 decrypts the encrypted access rights data using the public key associated with the node 1700-1 and, at operation 1722, the resulting decrypted access rights data is provided to the data management module 204-1. At operation 1724, the data management module 204-1 generates, based on the decrypted access rights data, a peer-to-peer request (e.g., message) for the retrieving the data object from the node 1700-2, and data management module 204-1 sends the generated request (e.g., directly) to the data management module 204-2 of the node 1700-2.

At operation 1726, the data management module 204-2 retrieves a data object key associated with the data object to be retrieved and a private key associated with the node 1700-2. At operation 1728, the data management module 204-2 retrieves the encrypted access rights data to the data object (that the node 1700-2 previously added (e.g., posted) to the blockchain 1702 for collection by the node 1700-1), and retrieves a public key associated with the node 1700-1. Using the public key associated with the node 1700-1, at operation 1730, the encryption/decryption module 208-1 encrypts the data object to be provided by the node 1700-2 to the node 1700-1. At operation 1732, the data management module 204-2 generates a peer-to-peer response (e.g., message) comprising the encrypted data object, and the data management module 204-2 sends the generated response (e.g., directly) to the data management module 204-1 of the node 1700-1. Additionally, at operation 1740, the data management module 204-2 logs completion of the transfer on the blockchain 1702.

At operation 1736, the data management module 204-1 retrieves a hash of the data object from the blockchain 1702. Additionally, the encrypted data object received by the data management module 204-1 may be decrypted using the private key associated with the node 1700-1. At operation 1738, the data management module 204-1 validates the data object receives from the node 1700-2 (via the data management module 204-2) using the hash retrieved at operation 1736. At operation 1742, responsive to the validation of the data object being successful, the data management module 204-1 adds (e.g., posts) a confirmation of retrieval of the data object to the blockchain 1702. Further, at operation 1734, the data management module 204-1 provides the data object to the API module 228-1, which in turn, at operation 1744, provides the data object to the software application that originally submitted the request for retrieval of the data object from the node 1700-2 at operation 1710.

Figure 18:
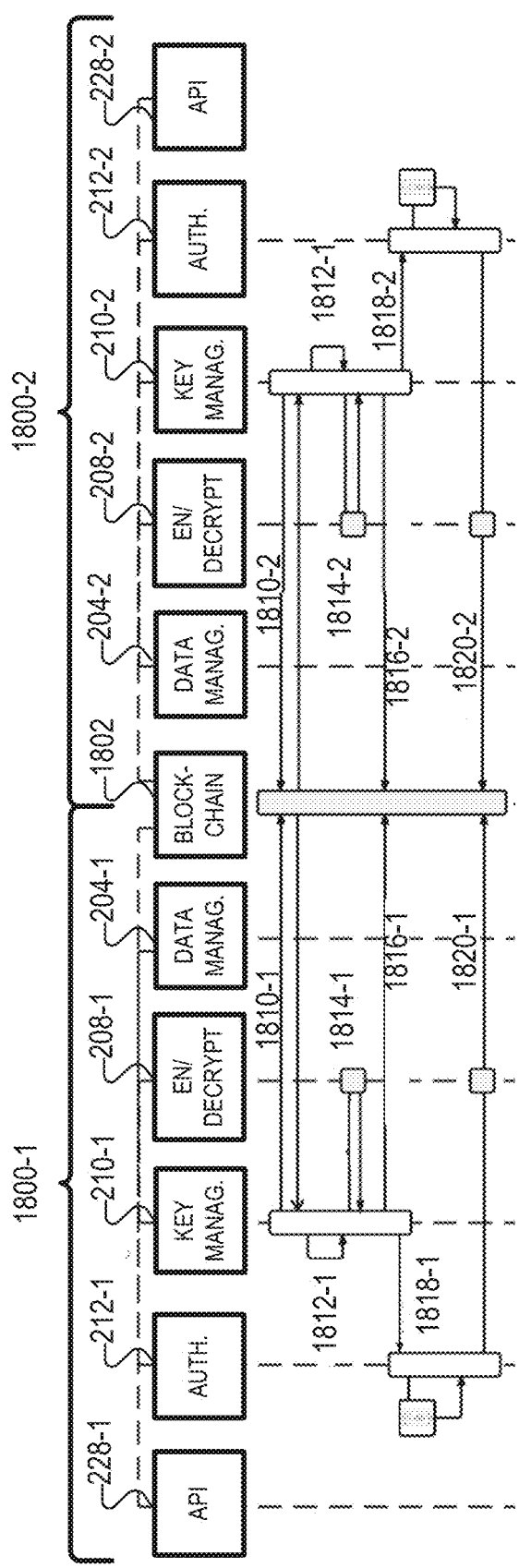

FIG. 18 illustrates operations with respect to example nodes 1800-1 and 1800-2 of the data collection system 200. For various embodiments described herein, the node 1800-1 represents the first node and the node 1800-2 represents the second node. As shown, each of the nodes 1800-1, 1800-2 comprises their own instance of the API module 228, the authentication module 212, the key management module 210, the encryption/decryption module 208, and the data management module 204. The nodes 1800-1, 1800-2 have access (e.g., write data to or read data from) to a (common) blockchain 1802, which may be facilitated by an instance of the blockchain module 206 (not shown) included by each of the nodes 1800-1, 1800-2.

According to some embodiments, FIG. 18 represents one or more operations of the data collection system 200 that may be performed by first and second nodes when a first user associates herself or himself with the first node and a second user associates herself or himself with the second node. As indicated in FIG. 18, the operations for registering a user are performed separately by each of the nodes 1800-1, 1800-2 are similar. Though the operations are described below with respect to the node 1800-1, it will be understood that the description provided equally applies to the node 1800-2.

At operation 1810-1, the key management module 210-1 requests and receives license data that provides the user associated with the node 1800-1 with permission to register and use the data collection system 200 (via the node 1800-1). At operation 1812-1, the key management module 210-1 generates a private key and public key for the node 1800-1, which will be associated with the node 1800-1 within the data collection system 200 and used for subsequent operations involving the node 1800-1, as described herein. Accordingly, at operation 1816-1, the key management module 210-1 adds (e.g., posts) the public key generated for (and thus, associated to) the node 1800-1 to the blockchain 1802 for use by various operations described herein. Additionally, at operation 1814-1, the encryption/decryption module 208-1 encrypts the key vault data. At operation 1818-1, the user (e.g., data owner) associated with the node 1800-1 authenticates herself or himself (e.g., using a username, password, biometrics, etc.) by the authentication module 212-1. Subsequently, at operation 1820-1, the confirmation of a successful authentication is logged on the blockchain 1802. The confirmation indicates that the user has successfully been associated with the node 1800-1.

Figure 19:
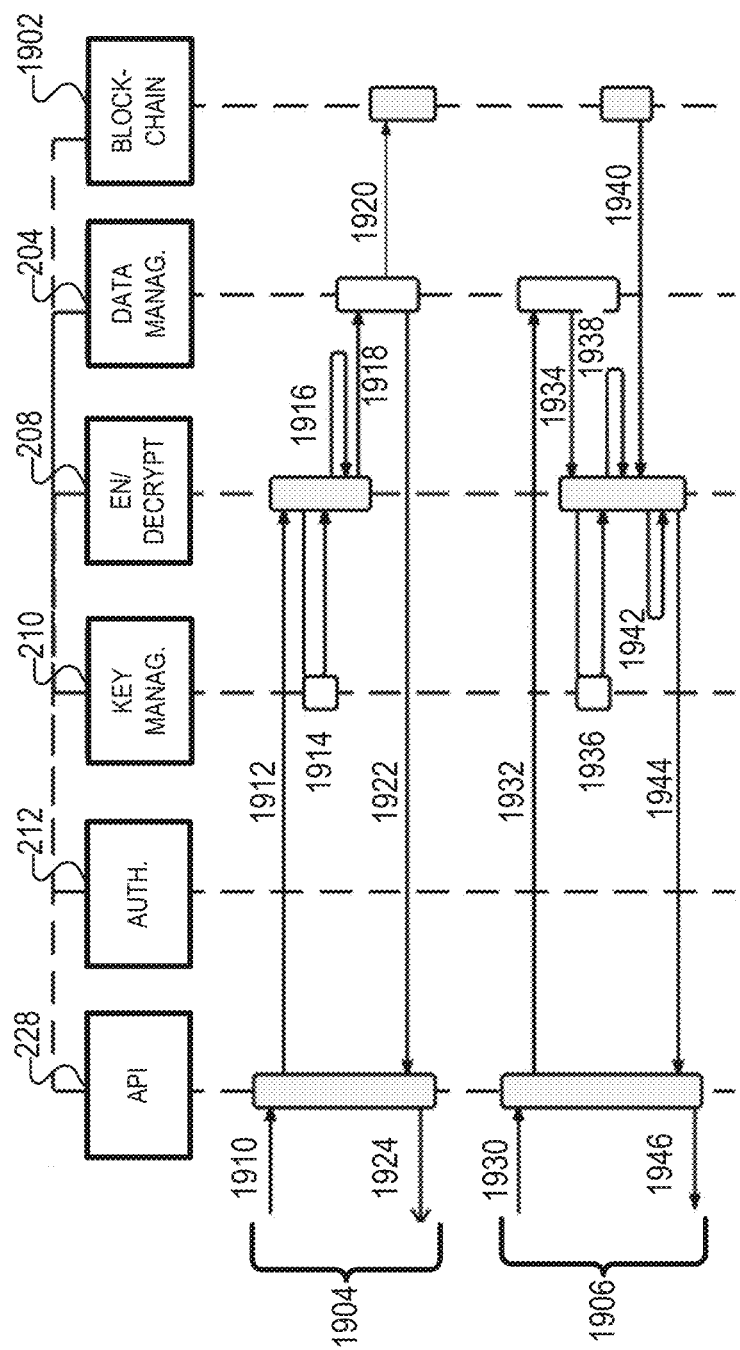

FIG. 19 illustrates operations with respect to an example node of the data collection system 200, where the node comprises the API module 228, the authentication module 212, the key management module 210, the encryption/decryption module 208, and the data management module 204. The node has access (e.g., write data to or read data from) to a blockchain 1902, which may be facilitated by the blockchain module 206 (not shown) included by the node.

According to some embodiments, FIG. 19 represents one or more operations of the data collection system 200 that may be performed by first and second nodes when the node stores a data object with respect to the node, and when the node retrieves a data object stored with respect to the node. In particular, operations 1904 relate to operations performed to store a data object with respect to a node, and operations 1906 relate to operation performed to retrieve a data object stored with respect to the node.

With respect to operations 1904, at operation 1910, a software application (on or external to the node) requests, through the API module 228, a data object be stored (e.g., saved) with respect to the node. According to some embodiment, storing the data object with respect to the node comprises storing the data object on a data storage device associated with the node, which may further comprise storing the data object using a data management system associated with (e.g., included by) the node. At operation 1912, the encryption/decryption module 208 is requested to encrypt the data object prior to the data object being stored. The encryption/decryption module 208 requests the key management module 210 generate a key for the data object (hereafter, a data object key) and, at operation 1916, the encryption/decryption module 208 encrypts the data object using the data object key to produce an encrypted data object. At operation 1918, the data management module 204 stores the encrypted data object with respect to the node, and adds (e.g., posts) a hash of the original data object (e.g., generated by the encryption/decryption module 208 prior to encryption) to the blockchain 1902. At operation 1922, the data management module 204 send confirmation of the storage to the API module 228, which in turn, at operation 1924, send a confirmation to the software application that originally submitted the request for storage of the data object at operation 1910.

With respect to operations 1906, at operation 1930, a software application (on or external to the node) requests, through the API module 228, retrieval of the data object stored (e.g., saved) with respect to the node (e.g., stored at operation 1918). At operation 1932, the data management module 204 retrieves the data object (which was encrypted prior storage) from a data storage device associated with the node. At operation 1934, the encryption/decryption module 208 is requested to decrypt the encrypted data object retrieved by the data management module 204 at operation 1932. At operation 1936, the encryption/decryption module 208 retrieve the data object key associated with the encrypted data object and, at operation 1938, the encryption/decryption module 208 decrypts the encrypted data object using the data object key to produce a decrypted data object. Additionally, at operation 1940, the encryption/decryption module 208 retrieves the hash associated with the data object from the blockchain 1902 and, at operation 1942, the encryption/decryption module 208 validates the data object using the hash retrieved from the blockchain 1902. In response to the validation of the data object being successful, at operation 1944, the decrypted data object is provided to the API module 228, which in turn, at operation 1946, provides the decrypted data object to the software application that originally submitted the request for retrieval of the data object from the node at operation 1930.

Figure 20:
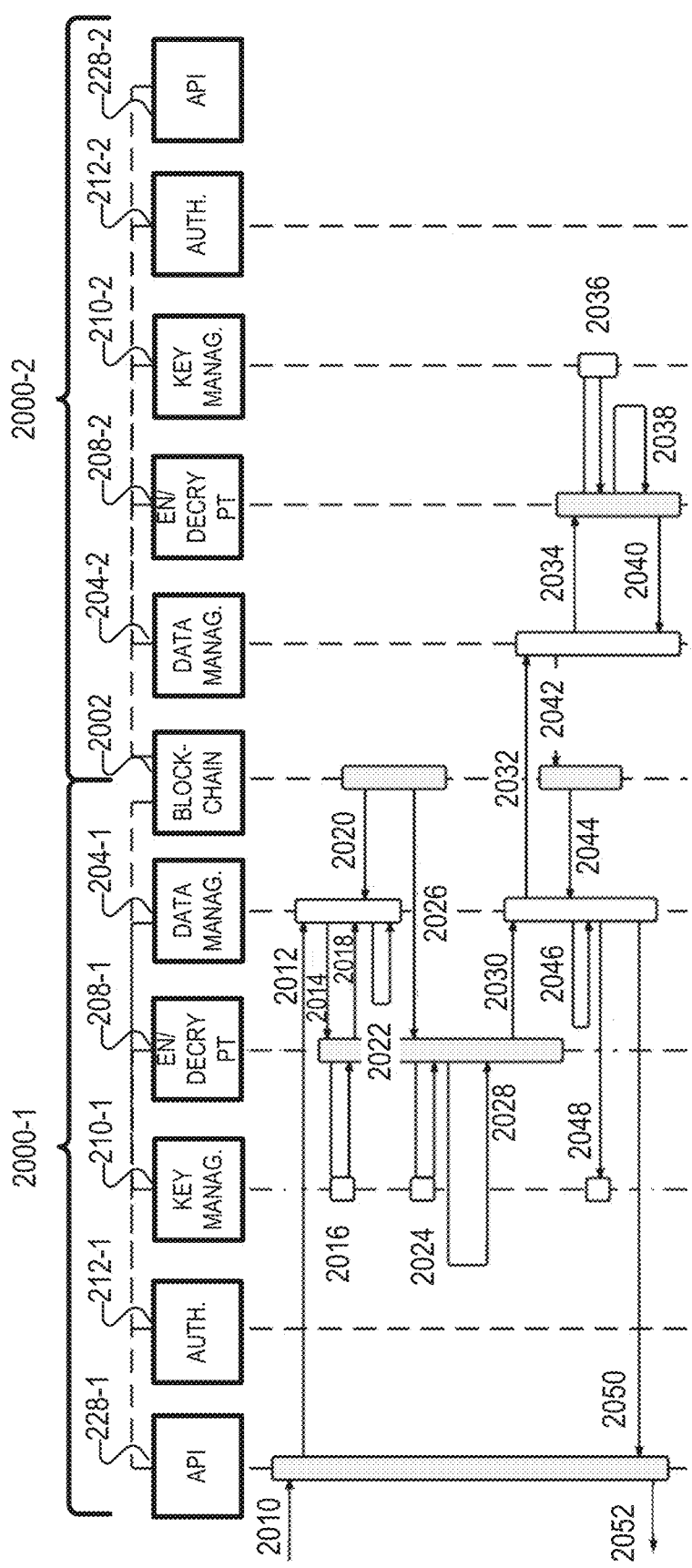

FIG. 20 illustrates operations with respect to example nodes 2000-1 and 2000-2 of the data collection system 200. For various embodiments described herein, the node 2000-1 represents the first node and the node 2000-2 represents the second node. As shown, each of the nodes 2000-1, 2000-2 comprises their own instance of the API module 228, the authentication module 212, the key management module 210, the encryption/decryption module 208, and the data management module 204. The nodes 2000-1, 2000-2 have access (e.g., write data to or read data from) to a (common) blockchain 2002, which may be facilitated by an instance of the blockchain module 206 (not shown) included by each of the nodes 2000-1, 2000-2.

According to some embodiments, FIG. 20 represents one or more operations of the data collection system 200 that may be performed by first and second nodes when the first node transfers (e.g., management and control) of a data object to the second node. At operation 2010, a software application (on or external to the node 1700-1) requests, through the API module 228-1, transfer of a data object from the node 1700-1 to the node 1700-2. At operation 2012, the data management module 204-1 retrieves the data object (which was encrypted prior storage) from a data storage device associated with the node 2000-1. At operation 2014, the encryption/decryption module 208-1 is requested to decrypt the encrypted data object retrieved by the data management module 204 at operation 2012. At operation 2016, the encryption/decryption module 208-1 retrieve the data object key associated with the encrypted data object and, at operation 2018, the encryption/decryption module 208-1 decrypts the encrypted data object using the data object key to produce a decrypted data object, which is subsequently provided to the data management module 204-1 to continue the transfer. At operation 2020, the data management module 204-1 retrieves a hash associated with the data object from the blockchain 2002 and, at operation 2022, the data management module 204-1 validates the decrypted data object using the hash retrieved from the blockchain 2002.

In response to the validation of the data object being successful, at operation 2026, the encryption/decryption module 208-1 retrieves a public key associated with the node 2000-2 from the blockchain 2002 and, at operation 2024, the encryption/decryption module 208-1 retrieves a private key associated with the node 2000-1 from the key management module 210-1. At operation 2028, the encryption/decryption module 208-1 encrypts the data object (decrypted data object resulting from operation 2018) by the private key of the node 2000-1 to produce a first encrypted data object, and then encrypts the first encrypted data object by the public key of the node 2000-2 to produce a second encrypted data object.

At operation 2030, the second encrypted data object is provided to the data management module 204-1. At operation 2032, the data management module 204-1 performs a peer-to-peer transfer (e.g., via message, distribute file system, cache database, etc.) of the second encrypted data object from the data management module 204-1 of the node 2000-1 to the data management module 204-2 of the node 2000-2.

Once the transfer is complete, at operation 2042, the data management module 204-2 registers completion of the transfer of the second encrypted data object on the blockchain 2002. At operation 2034, the encryption/decryption module 208-2 decrypts the second encrypted data object, first using the private key associated with the node 2000-2 (retrieved from the key management module 210-1, not shown) and then using the public key associated with the node 2000-1 (retrieved from the blockchain 2002, not shown). At operation 2036, the key management module 210-2 generate a new data object key for the data object (decrypted data object resulting at operation 2034) and, at operation 2038, the encryption/decryption module 208-2 encrypts the data object (decrypted data object resulting at operation 2034) using the new data object key to produce a new encrypted data object. At operation 2040, the data management module 204-2 stores the new encrypted data object with respect to the node 2000-2 (e.g., stored on a data storage device associated with the node 2000-2).

At operation 2044, the data management module 204-1 of the node 2000-1 retrieves confirmation of the transfer registered by the data management module 204-2 of the node 2000-2. In response, at operation 2046, the data management module 204-1 removes the data object stored with respect to the node 2000-1 (e.g., removed from the data storage device associated with the node 2000-1). Additionally, at operation 2048, the key management module 210-1 removes the data object key generated at the node 2000-1 for encryption of the data object on the node 2000-1. Subsequently, at operation 2050, the data management module 204-1 send confirmation of the transfer to the API module 228-1, which in turn, at operation 2052, provides sends confirmation of the transfer to the software application that originally submitted the request for transfer of the data object from the node 2000-1 to the node 2000-2 at operation 2010.

Figure 21:
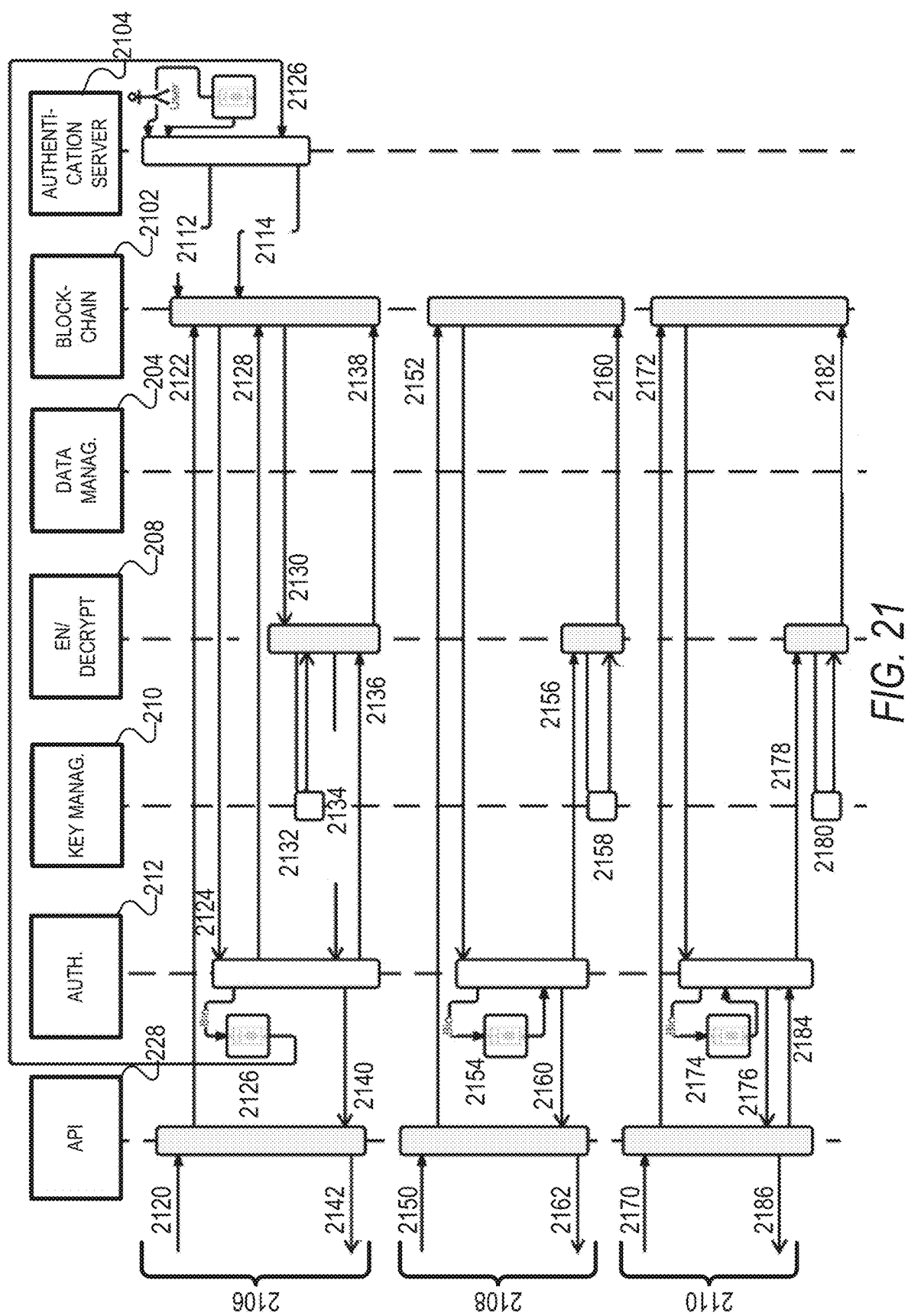

FIG. 21 illustrates operations with respect to an example node of the data collection system 200, where the node comprises the API module 228, the authentication module 212, the key management module 210, the encryption/decryption module 208, and the data management module 204. The node has access (e.g., write data to or read data from) to a blockchain 2102, which may be facilitated by the blockchain module 206 (not shown) included by the node. The node also interacts with an authentication server 2104, which facilitate operations with respect to the authentication module 212 of the node.

According to some embodiments, FIG. 21 represents one or more operations of the data collection system 200 that may be performed by a node when a user registers, authenticates, or verifies a transaction on the node. In particular, operations 2106 relate to operations performed to register a user with respect to a node, operations 2108 relate to operations performed to login a user with respect to a node, and operations 2110 relate to operations performed to verify a transaction with respect to a node. The With respect to operations 2106, at operation 2110, a software application (on or external to the node) requests, through the API module 228, registration of a user (hereafter, a registering user) with respect to the node. At operation 2122, the API module 228 retrieves the user's public key, user information (e.g., client identifier), and client device information (e.g., device identifier) from the blockchain 2102. The registering user's public key, the user information, or the client device information may be added (e.g., posted) to the blockchain 2102 by the authentication server 2104 (e.g., biometric registration server) at operation 2112, which may do so in response to the registering user authenticating herself or himself with the authentication server 2104 (at operation 2126) via the authentication module 212 (at operation 2124). Also, in response to the authentication module 212 authenticating the registering user at operations 2124 and 2126, the authentication server 2104 may add (e.g., post) to the blockchain 2102 the registering user's profile (e.g., comprising user profile data encrypted by the registering user's public key of the node) at operation 2114. At operation 2128, the authentication module 212 looks up and retrieves the encrypted user profile of the registering user from the blockchain 2102 (e.g., as posted at operation 2114), which is provided to the encryption/decryption module 208 at operation 2130. At operation 2132, the encryption/decryption module 208 retrieves a private key associated with the node from the key management module 21. At operation 2134, the encryption/decryption module 208 decrypts the encrypted user profile using the node's private key and provides the decrypted user profile to the authentication module 212. At operation 2136, the authentication module 212 completes the registration process of the registering user and generates audit data regarding user's registration, which may involve including at least some information from the user profile within audit data. At operation 2136, the encryption/decryption module 208 encrypts the audit data using the private key associated with the node and, at operation 2138, the encrypted audit data is added (e.g., posted) to the blockchain 2102.

At operation 2140, with the registration of the registering user being complete, the authentication module 212 shares user registration information for the (now) registered user to the API module 228. At operation 2142, the API module 228 sends the user registration information to the software application that originally submitted the registration request at operation 2120.

With respect to operations 2108, at operation 2150, a software application (on or external to the node) requests, through the API module 228, user login with respect to the node. At operation 2152, the API module 228 retrieves the user's public key, user information (e.g., client identifier), and client device information (e.g., device identifier) from the blockchain 2102, which may have been posted by operations 2112 as described herein. At operation 2154, the user requesting login (hereafter, the login user) authenticates herself or himself by the authentication module 212. At operation 2156, the authentication module 212 completes the login process of the login user and generates audit data regarding the user's login to the node. At operation 2156, the encryption/decryption module 208 encrypts the audit data using the private key associated with the node and retrieved from the key management module 210 at operation 2158. At operation 2160, the encrypted audit data is added (e.g., posted) to the blockchain 2102.

At operation 2160, the authentication module 212 informs the API module 228 that authentication is complete and, at operation 2162, the API module 228 sends confirmation of the authentication to the software application that originally submitted the login request at operation 2150.

With respect to operation 2110, at operation 2170, a software application (on or external to the node) requests, through the API module 228, to verify a transaction with respect to the node. At operation 2172, the API module 228 retrieves the user's public key, user information (e.g., client identifier), and client device information (e.g., device identifier) from the blockchain 2102, which may have been posted by operations 2112 as described herein. At operation 2174, the user requesting verification of a transaction (hereafter, the verifying user) authenticates herself or himself by the authentication module 212. At operation 2176, the authentication module 212 informs the API module 228 that the user authentication was successful. In response, at operation 2184, the API module 228 provides the authentication module 212 with audit data to be verified by the authentication module 212. At operation 2178, the authentication module 212 attempts to verify the audit data submitted and, if verification is successful, generates new audit data regarding the verification. At operation 2180, the encryption/decryption module 208 encrypts the audit data using the private key associated with the node and retrieved from the key management module 210 at operation 2180. At operation 2182, the encrypted audit data is added (e.g., posted) to the blockchain 2102.

Figure 22:
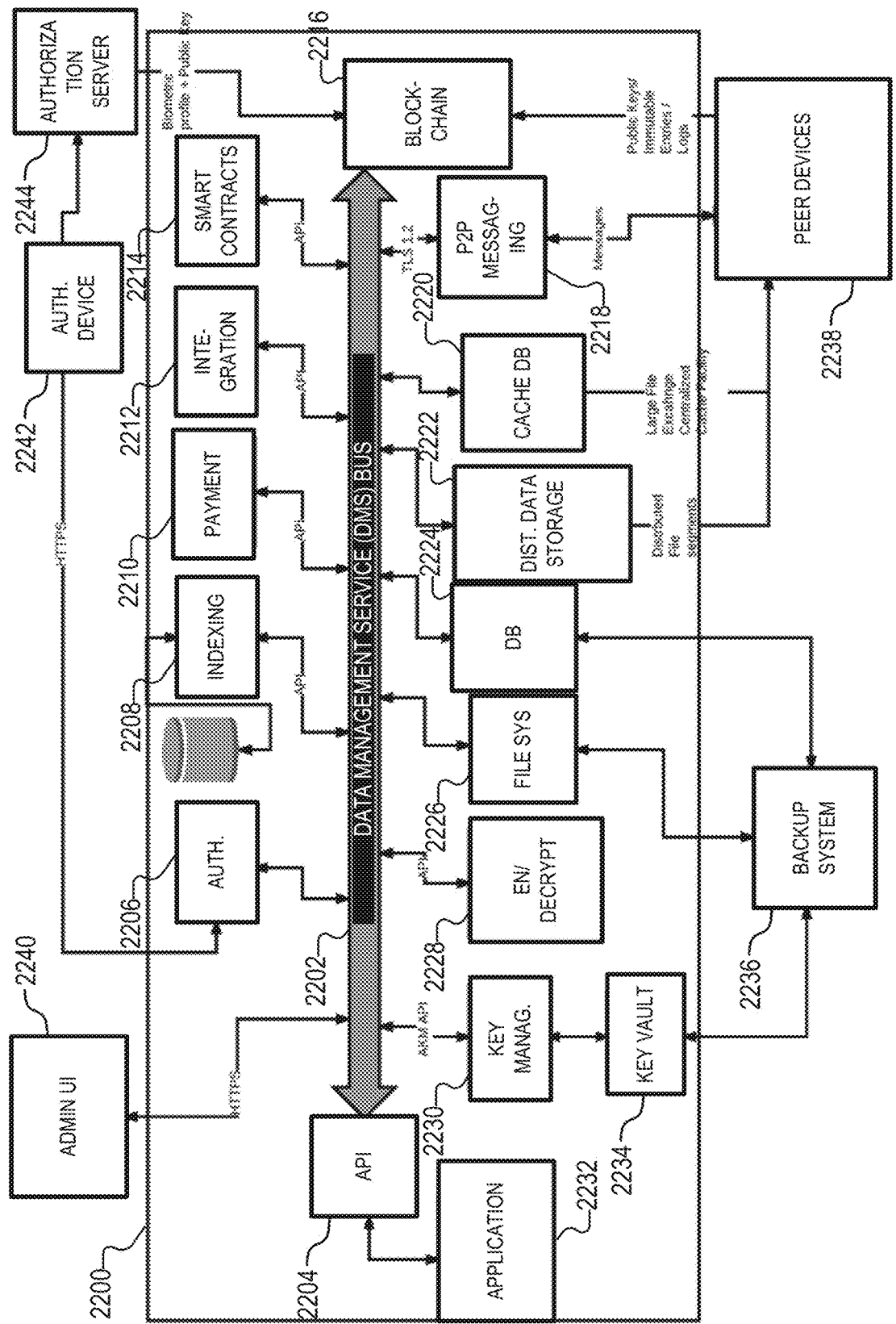
FIG. 22 is a diagram illustrating an example architecture of a data collection system with a blockchain, according to some embodiments.

FIG. 22 is a diagram illustrating an example architecture of a data collection system 2200 with a blockchain, according to some embodiments. For some embodiments, the data collection system 2200 may be similar to the data collection system 200 described herein with respect to FIG. 2. As shown, the data collection system 2200 comprises an API module 2204, an authentication module 2206, an data indexing module 2208, a payment module 2210, an integration module 2212, a smart contracts module 2214, a blockchain module 2216, a peer-to-peer (P2P) messaging module 2218, a cache database module 2220, a distribute data storage module 2222, a database module 2224, a file system module 2226, an encryption/decryption module 2228, a key management module 2230, and a key vault module 2234. As also shown, the data collection system 200 also includes a data management service (DMS) bus 2202, which may facilitate communication between one or more of the shown components within the data collection system 200.

The API module 2204 may support or facilitate receiving and responding to API calls with respect to a node of the data collection system 2200. For example, the API module 2204 may receive or respond to an API call with respect to a software application 2232, which may be internal or external to the data collection system 2200.

The authentication module 2206 may support or facilitate authentication of a user with respect to a node of the data collection system 2200. As shown, the authentication module 2206 may interface with an authentication device 2242 to facilitate one or more operations of the authentication module 2206.

The data indexing module 2208 may support or facilitate indexing of data (e.g., one or more data objects managed, controlled, tracked, etc.). For example, the data indexing module 2208 may provide an indexing service based on a dictionary ontology.

The payment module 2210 may support or facilitate payment processing on the data collection system 2200, such as between two or more nodes of the data collection system 2200. The integration module 2212 may support or facilitate for integration of a third-party system, an application, or a service with the data collection system 2200. The smart contracts module 2214 may support or facilitate execution of digital smart contracts, which may be with respect to two or more nodes of the data collection system 2200. The blockchain module 2216 may support or facilitate access (e.g., reading or writing data) by a node of the data collection system 2200 with respect to one or more blockchains.

The peer-to-peer (P2P) messaging module 2218 may facilitate or support P2P messaging between nodes of the data collection system 2200. The cache database module 2220 may facilitate or support exchanges of data objects (e.g., large data objects, such as files) between nodes of the data collection system 2200. The distribute data storage module 2222 may facilitate or support storage of one or more data objects with respect to a node of the data collection system 2200. The database module 2224 may facilitate or support database functionality on the data collection system 2200, which may be used by various operations or features of the data collection system 2200. The file system module 2226 may support or facilitate file system functionality for the data collection system 2200, which may be used for various operations or features of the data collection system 2200. The encryption/decryption module 2228 may facilitate or support data encryption or decryption operations on the data collection system 2200.

The key management module 2230 may facilitate or support key management operations with respect to a node of the data collection system 2200. For example, the key management module 2230 may comprise a key manager, such as one compliant with NIST/FESP-42 standard. The key vault module 2234 may facilitate or support storage of one or more keys (e.g., private or public keys) with respect to a node of the data collection system 2200.

In FIG. 22, the data collection system 2200 is shown to be communicating with an external backup system 2236, which may provide various data backup services to the data collection system 2200, and peer devices 2238, which may comprise client devices that users use to access and interact with the data collection system 2200. An administrator user interface (UI) 2240 may enable a system administrator to access various administrative functions with respect to the data collection system 2200. The authentication device 2242 and the authentication server 2244 may enable a user of the data collection system 2200 to authenticate themselves using one or more user-provided credentials, such as usernames, passwords, and biometric information. For example, the authentication device may comprise a client device and the authentication server 2244 may comprise a FIDO-compliant server, which may provide biometric profiles or public keys associated with various users of the data collection system 2200.

Figure 23:
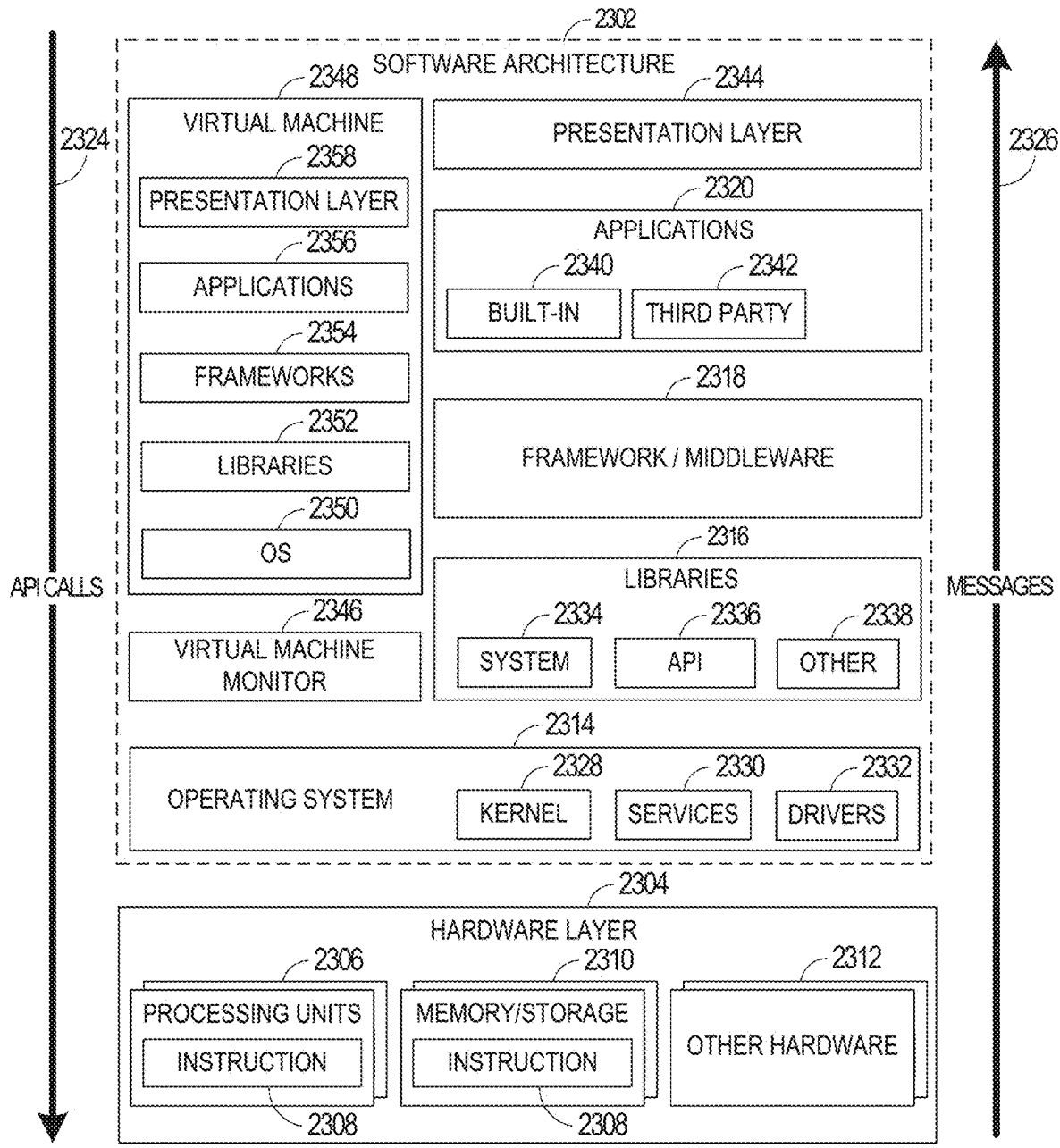
FIG. 23 is a block diagram illustrating a representative software architecture, which may be used in conjunction with various hardware architectures herein described, according to various embodiments of the present disclosure.
Figure 24:
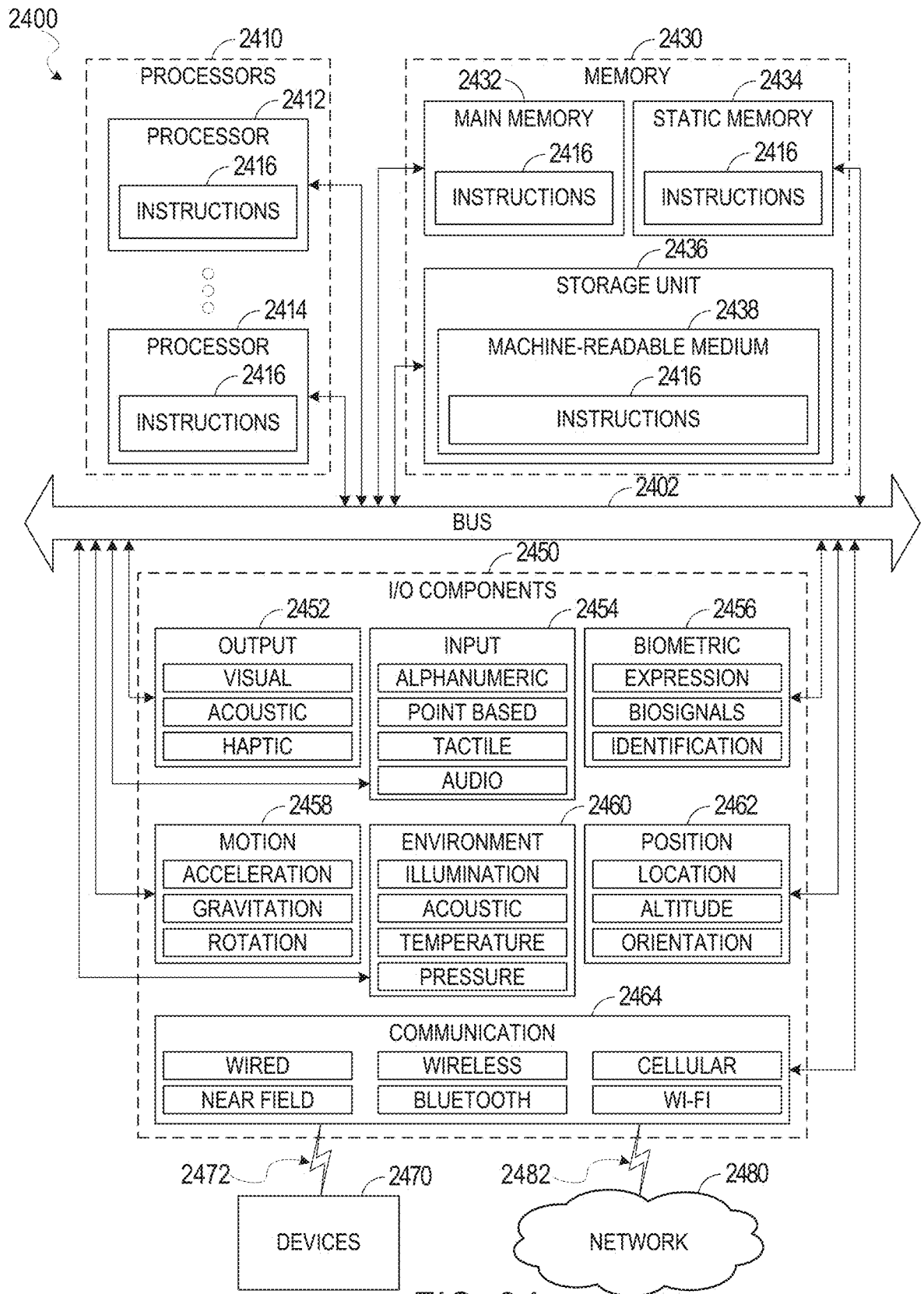
FIG. 24 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 23 or by way of the example machine illustrated by and described with respect to FIG. 24.

FIG. 23 is a block diagram illustrating an example of a software architecture 2302 that may be installed on a machine, according to some example embodiments. FIG. 23 is merely a non-limiting example of a software architecture, and it will be appreciated that many other architectures may be implemented to facilitate the functionality described herein. The software architecture 2302 may be executing on hardware such as a machine 2400 of FIG. 24 that includes, among other things, processors 2410, memory 2430, and I/O components 2450. A representative hardware layer 2304 is illustrated and can represent, for example, the machine 2400 of FIG. 24. The representative hardware layer 2304 comprises one or more processing units 2306 having associated executable instructions 2308. The executable instructions 2308 represent the executable instructions of the software architecture 2302, including implementation of the methods, modules, and so forth of FIGS. 1-8. The hardware layer 2304 also includes memory or storage modules 2310, which also have the executable instructions 2308. The hardware layer 2304 may also comprise other hardware 2312, which represents any other hardware of the hardware layer 2304, such as the other hardware illustrated as part of the machine 2400.

In the example architecture of FIG. 23, the software architecture 2302 may be conceptualized as a stack of layers, where each layer provides particular functionality. For example, the software architecture 2302 may include layers such as an operating system 2314, libraries 2316, frameworks/middleware 2318, applications 2320, and a presentation layer 2344. Operationally, the applications 2320 or other components within the layers may invoke API calls 2324 through the software stack and receive a response, returned values, and so forth (illustrated as messages 2326) in response to the API calls 2324. The layers illustrated are representative in nature, and not all software architectures have all layers. For example, some mobile or special-purpose operating systems may not provide a frameworks/middleware 2318 layer, while others may provide such a layer. Other software architectures may include additional or different layers.

The operating system 2314 may manage hardware resources and provide common services. The operating system 2314 may include, for example, a kernel 2328, services 2330, and drivers 2332. The kernel 2328 may act as an abstraction layer between the hardware and the other software layers. For example, the kernel 2328 may be responsible for memory management, processor management (e.g., scheduling), component management, networking, security settings, and so on. The services 2330 may provide other common services for the other software layers. The drivers 2332 may be responsible for controlling or interfacing with the underlying hardware. For instance, the drivers 2332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2316 may provide a common infrastructure that may be utilized by the applications 2320 and/or other components and/or layers. The libraries 2316 typically provide functionality that allows other software modules to perform tasks in an easier fashion than by interfacing directly with the underlying operating system 2314 functionality (e.g., kernel 2328, services 2330, or drivers 2332). The libraries 2316 may include system libraries 2334 (e.g., C standard library) that may provide functions such as memory allocation functions, string manipulation functions, mathematic functions, and the like. In addition, the libraries 2316 may include API libraries 2336 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2316 may also include a wide variety of other libraries 2338 to provide many other APIs to the applications 2320 and other software components/modules.

The frameworks 2318 (also sometimes referred to as middleware) may provide a higher-level common infrastructure that may be utilized by the applications 2320 or other software components/modules. For example, the frameworks 2318 may provide various graphic user interface (GUI) functions, high-level resource management, high-level location services, and so forth. The frameworks 2318 may provide a broad spectrum of other APIs that may be utilized by the applications 2320 and/or other software components/modules, some of which may be specific to a particular operating system or platform.

The applications 2320 include built-in applications 2340 and/or third-party applications 2342. Examples of representative built-in applications 2340 may include, but are not limited to, a home application, a contacts application, a browser application, a book reader application, a location application, a media application, a messaging application, or a game application.

The third-party applications 2342 may include any of the built-in applications 2340, as well as a broad assortment of other applications. In a specific example, the third-party applications 2342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 2342 may invoke the API calls 2324 provided by the mobile operating system such as the operating system 2314 to facilitate functionality described herein.

The applications 2320 may utilize built-in operating system functions (e.g., kernel 2328, services 2330, or drivers 2332), libraries (e.g., system libraries 2334, API libraries 2336, and other libraries 2338), or frameworks/middleware 2318 to create user interfaces to interact with users of the system. Alternatively, or additionally, in some systems, interactions with a user may occur through a presentation layer, such as the presentation layer 2344. In these systems, the application/module "logic" can be separated from the aspects of the application/module that interact with the user.

Some software architectures utilize virtual machines. In the example of FIG. 23, this is illustrated by a virtual machine 2348. The virtual machine 2348 creates a software environment where applications/modules can execute as if they were executing on a hardware machine (e.g., the machine 2400 of FIG. 24). The virtual machine 2348 is hosted by a host operating system (e.g., the operating system 2314) and typically, although not always, has a virtual machine monitor 2346, which manages the operation of the virtual machine 2348 as well as the interface with the host operating system (e.g., the operating system 2314). A software architecture executes within the virtual machine 2348, such as an operating system 2350, libraries 2352, frameworks/middleware 2354, applications 2356, or a presentation layer 2358. These layers of software architecture executing within the virtual machine 2348 can be the same as corresponding layers previously described or may be different.

FIG. 24 illustrates a diagrammatic representation of a machine 2400 in the form of a computer system within which a set of instructions may be executed for causing the machine 2400 to perform any one or more of the methodologies discussed herein, according to an embodiment. Specifically, FIG. 24 shows a diagrammatic representation of the machine 2400 in the example form of a computer system, within which instructions 2416 (e.g., software, a program, an application, an apples, an app, or other executable code) for causing the machine 2400 to perform any one or more of the methodologies discussed herein may be executed. For example, the instructions 2416 may cause the machine 2400 to execute the method 240 of FIG. 1, the method 500 of FIG. 5, the method 600 of FIG. 6, the method 700 of FIG. 7, or the method 800 of FIG. 8. Additionally, or alternatively, the instructions 2416 may implement FIGS. 3A-3F. The instructions 2416 transform the general, non-programmed machine 2400 into a particular machine 2400 programmed to carry out the described and illustrated functions in the manner described. In alternative embodiments, the machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2416, sequentially or otherwise, that specify actions to be taken by the machine 2400. Further, while only a single machine 2400 is illustrated, the term "machine" shall also be taken to include a collection of machines 2400 that individually or jointly execute the instructions 2416 to perform any one or more of the methodologies discussed herein.

The machine 2400 may include processors 2410, memory 2430, and I/O components 2450, which may be configured to communicate with each other such as via a bus 2402. In an embodiment, the processors 2410 (e.g., a central processing unit (CPU), a reduced instruction set computing (RISC) processor, a complex instruction set computing (MC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2412 and a processor 2414 that may execute the instructions 2416. The term "processor" is intended to include multi-core processors that may comprise two or more independent processors (sometimes referred to as "cores") that may execute instructions contemporaneously. Although FIG. 24 shows multiple processors 2410, the machine 2400 may include a single processor with a single core, a single processor with multiple cores (e.g., a multi-core processor), multiple processors with a single core, multiple processors with multiples cores, or any combination thereof.

The memory 2430 may include a main memory 2432, a static memory 2434, and a storage unit 2436 including machine-readable medium 2438, each accessible to the processors 2410 such as via the bus 2402. The main memory 2432, the static memory 2434, and the storage unit 2436 store the instructions 2416 embodying any one or more of the methodologies or functions described herein. The instructions 2416 may also reside, completely or partially, within the main memory 2432, within the static memory 2434, within the storage unit 2436, within at least one of the processors 2410 (e.g., within the processor's cache memory), or any suitable combination thereof, during execution thereof by the machine 2400.

The I/O components 2450 may include a wide variety of components to receive input, provide output, produce output, transmit information, exchange information, capture measurements, and so on. The specific I/O components 2450 that are included in a particular machine will depend on the type of machine. For example, portable machines such as mobile phones will likely include a touch input device or other such input mechanisms, while a headless server machine will likely not include such a touch input device. It will be appreciated that the I/O components 2450 may include many other components that are not shown in FIG. 24. The I/O components 2450 are grouped according to functionality merely for simplifying the following discussion, and the grouping is in no way limiting. In various embodiments, the I/O components 2450 may include output components 2452 and input components 2454. The output components 2452 may include visual components (e.g., a display such as a plasma display panel (PDP), a light-emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 2450 may include biometric components 2456, motion components 2458, environmental components 2460, or position components 2462, among a wide array of other components. For example, the biometric components 2456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2458 may include acceleration sensor components (e.g., accelerometer), gravitation sensor components, rotation sensor components (e.g., gyroscope), and so forth. The environmental components 2460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2450 may include communication components 2464 operable to couple the machine 2400 to a network 2480 or devices 2470 via a coupling 2482 and a coupling 2472, respectively. For example, the communication components 2464 may include a network interface component or another suitable device to interface with the network 2480. In further examples, the communication components 2464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2470 may be another machine or any of a wide variety of peripheral devices (e.g., a peripheral device coupled via a USB).

Moreover, the communication components 2464 may detect identifiers or include components operable to detect identifiers. For example, the communication components 2464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2464, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 2400 including processors 2410), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 2400, but deployed across a number of machines 2400. In some example embodiments, the processors 610 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 2430, 2432, 2434, and/or the memory of the processor(s) 2410) and/or the storage unit 2436 may store one or more sets of instructions 2416 and data structures (e.g., software) embodying or utilized by any one or more of the methodologies or functions described herein. These instructions (e.g., the instructions 2416), when executed by the processor(s) 2410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 2416 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 2480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2480 or a portion of the network 2480 may include a wireless or cellular network, and the coupling 2482 may be a Code Division Multiple Access (CDMA) connection, a Global System for Mobile communications (GSM) connection, or another type of cellular or wireless coupling. In this example, the coupling 2482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 2470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:
   storing, by a first node associated with a first user, a data object on a first data storage device to produce a stored data object on the first data storage device, the first data storage device being associated with the first node;
   recording on a blockchain, by the first node, storage of the data object on the first data storage device, the recording comprising storing a hash of the data object on the blockchain to produce a stored hash in the blockchain;
   receiving, at the first node, a request by the first node to transfer the stored data object to a second node, the second node being associated with a second user;
   in response to the request by the first node to transfer the stored data object to the second node:
   retrieving, to the first node, the stored data object from the first data storage device to produce a first retrieved data object;
   retrieving, to the first node, the stored hash from the blockchain to produce a first retrieved hash;
   validating, by the first node, the first retrieved hash; and
   transferring, by the first node, the stored data object from the first node to the second node responsive to the validating the first retrieved hash being successful, the transferring comprising:
   retrieving a second node public key associated with the second node;
   retrieving, from a key manager on the first node, a first node private key associated with the first node;
   encrypting, by the first node private key, the first retrieved data object to produce a first encrypted data object;
   encrypting, by the second node public key, the first encrypted data object to produce a second encrypted data object; and
   transferring the second encrypted data object from the first node to the second node.

2. The method of claim 1, wherein the storing the data object on the first data storage device to produce the stored data object on the first data storage device comprises:
   generating, by the key manager on the first node, a data object key for the data object;
   encrypting, by the data object key, the data object to produce a third encrypted data object; and
   storing the third encrypted data object on the first data storage device to produce the stored data object on the first data storage device.

3. The method of claim 2, wherein the retrieving the stored data object from the first data storage device to produce the first retrieved data object comprises:
   retrieving the data object key from the key manager to produce a retrieved key;
   retrieving the stored data object from the first data storage device to produce a second retrieved data object; and
   decrypting, by the retrieved key, the second retrieved data object to produce the first retrieved data object.

4. The method of claim 1, wherein the transferring the stored data object from the first node to the second node responsive to the validating the first retrieved hash being successful further comprises:
   determining whether the transferring the stored data object from the first node to the second node was completed; and
   in response to determining that the transferring the stored data object from the first node to the second node was completed:
   removing the stored data object from the first data storage device; and
   removing, from the key manager on the first node, a data object key for the data object.

5. The method of claim 1, further comprising:
   receiving, at the first node, a request by the second node for an access right to the stored data object,
   in response to the request by the second node for the access right to the stored data object;
   authenticating the request by the second node for the access right to the stored data object; and
   providing the second node the access right to the stored data object by storing access rights data for the stored data object on the blockchain responsive to the authenticating being successful.

6. The method of claim 5, wherein the receiving the request by the second node for the access right to the stored data object comprises:
   receiving, at the first node, an encrypted access request;
   retrieving the second node public key associated with the second node;
   retrieving, from the key manager on the first node, the first node private key associated with the first node;
   decrypting, by the first node private key, the encrypted access request to produce a first decrypted access request; and
   decrypting, by the second node public key, the first decrypted access request to produce the request by the second node for the access right.

7. A method comprising:
   generating, by a first node associated with a first user, a request for an access right to a data object stored on a particular data storage device, the particular data storage device being associated with a second node, and the second node being associated with a second user, the generating comprising:
   retrieving, by the first node, a second node public key associated with the second node;
   retrieving, from a key manager on the first node, a first node private key associated with the first node;
   encrypting, by the first node using the first node private key, the request for the access right to the data object to produce a first encrypted access request object;
   encrypting, by the first node using the second node public key, the first encrypted access request object to produce a second encrypted access request; and
   storing, by the first node, the second encrypted access request on a blockchain;
   sending, from the first node to the second node, the request for the access right by storing the request for the access right on the blockchain;
   retrieving, by the first node, access rights data for the data object from the second node by retrieving the access rights data from the blockchain to produce retrieved access rights data, the access rights data being stored on the blockchain, by the second node, responsive to the request; and retrieving, at the first node, the data object from the second node to produce a retrieved data object, the retrieving being based on the retrieved access rights data.

8. The method of claim 7, wherein the retrieving the data object from the second node comprises:

generating, by the first node, a request to retrieve the data object from the second node, the request being generated based on the retrieved access rights data;

sending, from the first node to the second node, the request to retrieve the data object from the second node;

receiving, at the first node, a response from the second node, the response including a copy of the data object; and providing, by the first node, the copy of the data object.

9. The method of claim 8, wherein the retrieving the data object from the second node further comprises:

retrieving, at the first node, a hash of the data object from the blockchain to produce a retrieved hash;

validating, by the first node, the retrieved hash; and recording on the blockchain, by the first node, retrieval of the copy of the data object responsive to the validating the retrieved hash being successful.

* * * * *